US008798253B2

(12) United States Patent
Allen et al.

(10) Patent No.: US 8,798,253 B2
(45) Date of Patent: Aug. 5, 2014

(54) NETWORK ROUTING

(75) Inventors: Curtis E. Allen, Colorado Springs, CO (US); Phillip D. Crable, Falcon, CO (US); Mariafranca Gregorat, Dallas, TX (US); Steven L. Lass, Allen, TX (US); Richard L. McClain, Frisco, TX (US); Sandra A. Paiement, Colorado Springs, CO (US); Timothy Dwight, Richardson, TX (US); James L. Verlare, Colorado Springs, CO (US); Yung-Hwa Tai, Holmdel, NJ (US); Gregory Welch, Somerset, NJ (US); Yaron Raps, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1597 days.

(21) Appl. No.: 11/460,750

(22) Filed: Jul. 28, 2006

(65) Prior Publication Data
US 2007/0071221 A1   Mar. 29, 2007

Related U.S. Application Data

(60) Provisional application No. 60/703,812, filed on Jul. 29, 2005, provisional application No. 60/764,748, filed on Feb. 3, 2006.

(51) Int. Cl.
*H04M 3/00* (2006.01)
(52) U.S. Cl.
USPC ............ 379/265.01; 379/265.09; 379/142.01; 379/127.01

(58) Field of Classification Search
USPC ........... 379/142.01, 265.01, 265.09; 709/203, 709/227
See application file for complete search history.

(56) References Cited

U.S. PATENT DOCUMENTS

| 5,689,553 | A  | * | 11/1997 | Ahuja et al. ............. 379/202.01 |
| 6,578,076 | B1 |   | 6/2003  | Putzolu |
| 6,701,160 | B1 |   | 3/2004  | Pinder et al. |
| 7,079,627 | B2 | * | 7/2006  | Crago et al. .................... 379/45 |
| 7,155,248 | B2 | * | 12/2006 | Idnani ........................... 455/519 |
| 7,209,458 | B2 |   | 4/2007  | Ahvonen |
| 7,606,902 | B2 |   | 10/2009 | Rao et al. |
| 2003/0027569 | A1 | | 2/2003 | Ejzak |
| 2003/0046396 | A1 | | 3/2003 | Richter |
| 2004/0068574 | A1 | | 4/2004 | Costa Requena et al. |

(Continued)

FOREIGN PATENT DOCUMENTS

| WO | WO-01/74108  | 10/2001 |
| WO | WO-01/78328  | 10/2001 |
| WO | WO2004/008786 | 1/2004 |

OTHER PUBLICATIONS

"3rd Generation Partnership Project; Technical Specification Group Services and System Aspects; Internet Protocol (IP) Based IP Multimedia Subsystem (IMS) Emergency Sessions; (Release 7)," 3GPP TR 23,867 V1.0.0, pp. 1-82, May 2005.

(Continued)

*Primary Examiner* — Duc Nguyen
*Assistant Examiner* — Yosef K Laekemariam

(57) ABSTRACT

At least one device receives a call request from a calling party to a called party. The device routes the call request to an Internet Protocol Multimedia Subsystem (IMS) core when a first condition is met and bypasses the IMS core when a second condition is met.

16 Claims, 14 Drawing Sheets

(56) References Cited

U.S. PATENT DOCUMENTS

| | | |
|---|---|---|
| 2004/0148416 A1* | 7/2004 | Aarnos et al. ............ 709/230 |
| 2004/0190498 A1 | 9/2004 | Kallio et al. |
| 2005/0014483 A1 | 1/2005 | Lagerstrom |
| 2005/0050194 A1 | 3/2005 | Honeisen et al. |
| 2005/0050195 A1 | 3/2005 | Chen et al. |
| 2005/0064883 A1 | 3/2005 | Heck |
| 2005/0177616 A1 | 8/2005 | Addington et al. |
| 2005/0213606 A1 | 9/2005 | Huang et al. |
| 2006/0104431 A1 | 5/2006 | Emery et al. |
| 2006/0206504 A1* | 9/2006 | Cai et al. ............ 707/100 |
| 2006/0253538 A1 | 11/2006 | Jung et al. |
| 2006/0270404 A1 | 11/2006 | Tuohino et al. |
| 2007/0201452 A1 | 8/2007 | Berna Fornies et al. |

OTHER PUBLICATIONS

"Digital Cellular Telecommunications System (Phase 2+); Universal Mobile Telecommunications System (UMTS); IP Multimedia Subsystem (IMS); Stage 2 (3GPP Ts 23.228 Version 6.10.0 Release 6); ETSI TS 123 228," pp. 1-182, Jun. 2005.

* cited by examiner

NETWORK ROUTING

PRIORITY INFORMATION

The present application claims priority to U.S. Provisional Patent Application No. 60/703,812, filed Jul. 29, 2005, and U.S. Provisional Patent Application No. 60/764,748, filed Feb. 3, 2006. The entire contents of both provisional applications are incorporated herein by reference in their entireties.

BACKGROUND INFORMATION

The Internet Protocol Multimedia Subsystem (IMS) provides mobile and fixed multimedia services. The aim of IMS is not only to provide new services, but all the services, current and future, that the Internet provides. In this way, IMS gives network operators and service providers the ability to control and charge for each service. In addition, users are given the ability to execute services from their home networks, as well as when the users are roaming.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF PREFERRED EMBODIMENTS

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with principles of the invention relate to routing traffic in relation to an Internet Protocol (IP) Multimedia Subsystem (IMS) (also referred to as an "IMS core" or "IMS platform"). The IMS core may be used for routing calls/data sessions from various originations towards various destinations with possible invocation of value-added service during processing and routing determination. Calls not involving IMS subscriber endpoints or IMS-based applications may bypass the IMS core for operational efficiency (i.e., latency).

It will be appreciated that the telephony terminology that is used herein covers the United States based PSTN structure. Implementations consistent with principles of the invention are not so limited. For example, implementations consistent with principles of the invention are equally applicable to other communication networks.

Exemplary System

Figure 1:
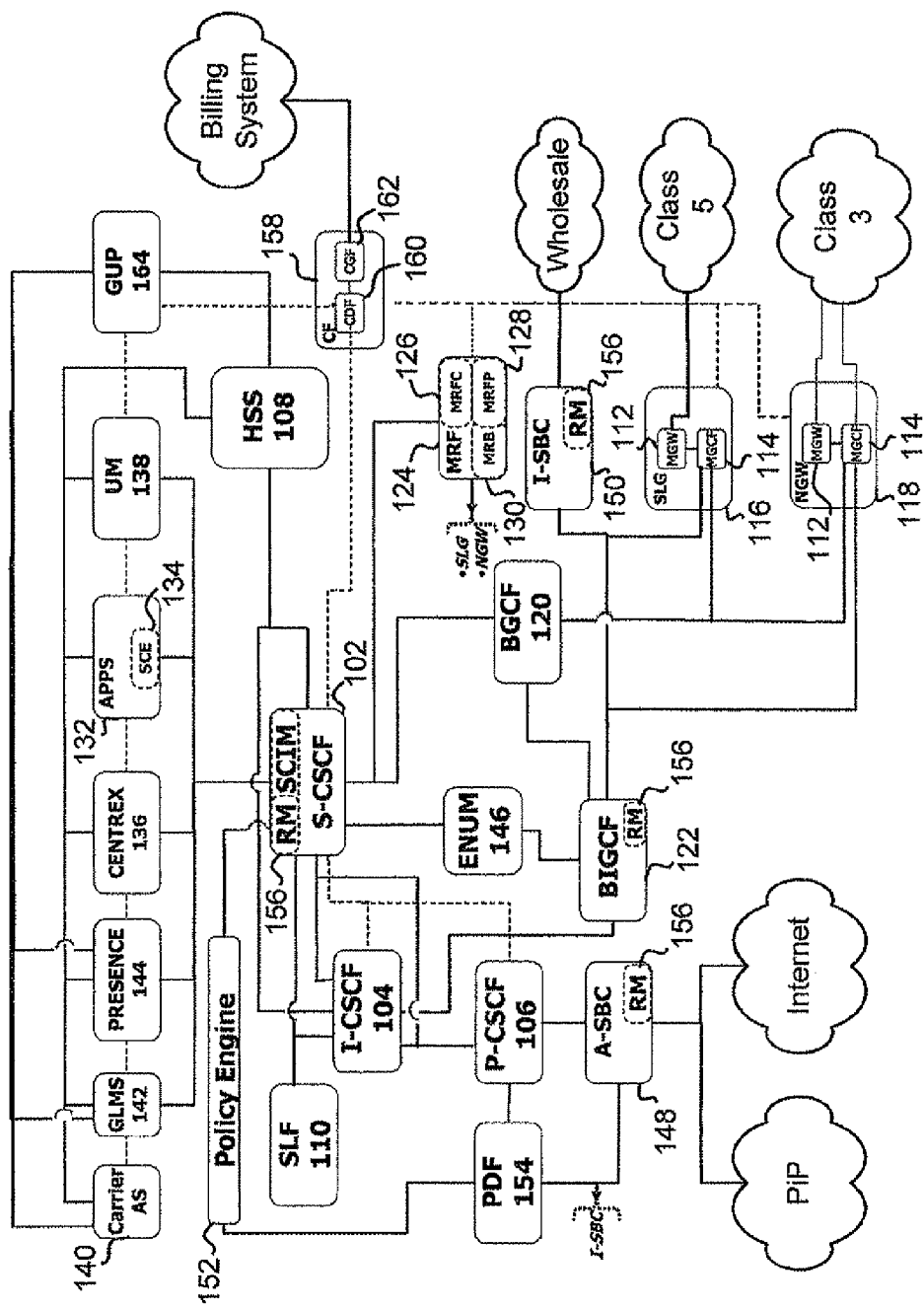
FIG. 1 illustrates an exemplary system in which systems and methods, consistent with principles of the invention, may be implemented.

FIG. 1 illustrates an exemplary system 100 in which systems and methods, consistent with principles of the invention, may be implemented. As illustrated, system 100 may include a serving call session control function (S-CSCF) 102, an interrogating call session control function (I-CSCF) 104, a proxy call session control function (P-CSCF) 106, a home subscriber server (HSS) 108, a subscription location function (SLF) 110, two media gateway (MOW) functions 112, two media gateway control functions (MGCFs) 114, a shared local gateway (SLG) 116, a network gateway (NGW) 118, a breakout gateway control function (BGCF) 120, a break in gateway control function (BIGCF) 122, a multimedia resource function (MRF) 124 that may include a multimedia resource function controller (MRFC) 126, a multimedia resource function processor (MRFP) 128, and a media resource broker (MRB) 130, one or more application servers 132, Services Creation Environment (SCE) logic 134, a central office exchange service (CENTREX) 136, a unified messaging service (UM) 138, a carrier application service (AS) 140, a group list management server (GLMS) 142, a presence service 144, a telephone number mapping (ENUM) server 146, an access session border controller (A-SBC) 148, an internetworking session border controller (I-SBC) 150, a policy engine 152, a policy decision function (PDF) 154, a resource management function (RM) 156, a charging function (CF) 158, a charging data function (CDF) 160, a charging gateway function (CGF) 162, and a generic user profile (GUP) 164. Although not specifically depicted in FIG. 1, the IMS core may include, for example, S-CSCF 102, I-CSCF 104, P-CSCF 106, and HSS 108. The number of components illustrated in FIG. 1 is provided for simplicity. In practice, a typical system could include more or fewer components than illustrated in FIG. 1. Moreover, it will be appreciated that the IMS standards are continually evolving. Implementations described herein are equally applicable to current and future IMS standards.

A. Call Session Control Components

S-CSCF 102, I-CSCF 104, and P-CSCF 106 may be considered call session control components in system 100. The call control components may be responsible for parsing a session (e.g., a session initiation protocol (SIP) session) and applying logic (e.g., business logic, service logic, operational logic, etc.) on a per event basis. The outcome of the session control may be to route an event to the appropriate components and/or append SIP headers and values.

S-CSCF 102 may be viewed as the brain of the IMS core. S-CSCF 102 may perform session control and registration services for the users of the IMS core. S-CSCF 102 may receive a user profile from HSS 108 and route sessions requested by an IMS user (also called an "IMS subscriber" or "subscriber"). Additionally, S-CSCF 102 may perform user authentication based on information from HSS 108.

In some implementations, S-CSCF 102 may include a Service Capability Interaction Manager (SCIM) and Resource Management (RM) functions. The SCIM may be responsible for orchestrating the offerings of one or more application services across various service enabling technologies and platforms to produce valued services for IMS users. The RM may be responsible for executing business rules and service level agreements (SLAs) by allocating the appropriate resources.

I-CSCF 104 may act as the main point of contact for connections to subscribers served by other IP networks. I-CSCF 104 may be located at the edge of the IMS core. I-CSCF 104 may receive SIP messages and identify the next hops for the SIP messages. To achieve this, I-CSCF 104 may query HSS 108 for the location (e.g., an address) of the appropriate S-CSCF to which a particular SIP message is to be forwarded.

P-CSCF 106 may act as the main point of contact for connections to subscribers of the local IMS. As such, P-CSCF 106 may validate requests, forward the requests to selected destinations, and process and forward the responses. P-CSCF 106 may generate chargeable events and send information relating to the chargeable events to CF 158. Additionally, P-CSCF 106 may interact with PDF 154 to grant, reject, or downgrade a session request based on platform resources and quality of service (QoS) measurements.

HSS 108 may include one or more servers that act as the central repository for user-related information. HSS 108 may contain user-related subscription information for handling multimedia sessions. Some of the information contained in HSS 108 may include information identifying the location of a particular S-CSCF 102 for a particular user. As indicated above, the location of a particular S-CSCF 102 may be conveyed to I-CSCF 104 upon receiving a query from a network element. HSS 108 may also include user profile information that contains service trigger points and information identifying the corresponding resources (e.g., applications, media, services, etc.) that offer the services. The user profile information may be forwarded to S-CSCF 102 for session control and service treatment. Moreover, HSS 108 may provide and receive updates directly from application servers 132.

SLF 110 may include one or more databases that contain service location information for subscribers. SLF 110 may receive a query, containing identification information for a subscriber, from I-CSCF 104 and return, based on the subscriber identification information, information identifying an HSS 108 that serves the subscriber.

B. Gateways and Gateway Control Functions

System 100 may include various components that bridge the IMS core to external networks, such as a public switched telephone network (PSTN), the Internet, etc. These components, which may include MGW function 112, MGCF 114, SLG 116, NGW 118, BGCF 120, and BIGCF 122, may perform protocol conversion and event routing to or from the IMS core.

MGW function 112 may connect PSTN networks and the IMS core. In one implementation, MGW function 112 may terminate bearer channels from a PSTN network and media steams from the IMS core (e.g., real-time transport protocol (RTP) streams in an IP network or Asynchronous transfer mode Adaptation Layer 2 (AAL2)/ATM connections in an ATM backbone), execute the conversion between these terminations, and perform transcoding and signal processing. In addition, MGW function 112 may provide tones and announcements to Circuit Switched (CS) users. In one implementation consistent with principles of the invention, MGW function 112 may operate under the control of MGCF 114.

MGCF 114 may be part of the gateway infrastructure that enables communication between the IMS core and PSTN networks. MGCF 114 may perform protocol conversion between the Integrated Services Digital Network (ISDN) User Part (ISUP) or Primary Rate Interface (PRI) and SIP protocols before forwarding a session to the IMS core. In similar fashion, IMS-originated sessions directed towards PSTN users may traverse MGCF 114. MGCF 114 may control media channels in MGW 112. In addition, MGCF 114 may report account information to CF 158.

SLG 116 may include an MGCF 114 and a set of associated MGW 112 entities within the same physical entity. SLG 116 may connect the IMS core to the local exchange layer of the PSTN. In one implementation, the interfaces between SLG 116 and the local exchange networks may include DS0 or Digital Signal 1 (DS1)-based Non-Facilities Associated Signaling (NFAS) PRIs.

NGW 118 may include an MGCF 114 and a set of associated MGW 112 entities which physically reside in a separate physical entities. NGW 118 may connect the IMS core to the Long Distance layer of the PSTN. In one implementation, the interfaces between MGCF 114 of NGW 118 and the Long Distance networks may include DS0 or DS1-based signaling system 7 (SS7) interfaces and the interfaces between MGW 112 of NGW 118 and the Long Distance networks may include DS1-bearer channels.

BGCF 120 may connect IMS-initiated calls to Circuit Switch (CS) customers (e.g., an IMS user calling a telephone number in the PSTN). BGCF 120 may, based on a routing policy, select an appropriate network in which the connection is to be made or may select the appropriate MGCF 114 to the other network.

BIGCF 122 may correspond to an ingress point that handles incoming calls from PSTN gateways (e.g., NGW 118, SLG 116, I-SBC 150), wholesale gateways, other IP-based carriers (e.g., based on Voice over Internet Protocol (VoIP) peering agreements), Emergency Services Peering Points, etc. BIGCF 122 may route calls from and to non-IMS subscribers. BIGCF 122 may route calls to the IMS core, when the calls are destined for IMS subscribers or when IMS applications are invoked, or may bypass the IMS core elements (P-CSCF 106, I-CSCF 104, S-CSCF 102, HSS 108, etc.) when calls are destined for non-IMS subscribers and no IMS applications are invoked by the calling party or called party. BIGCF 122 may route calls to PSTN-based termination points to BGCF 120 and route calls to IP-based termination points (e.g., a wholesale termination point, IP-based carriers, etc.) directly to I-SBCs 150 associated with the IP-based termination points. BIGCF 122 may include static routing policies to route emergency calls to BGCF 120. BGCF 120 may also support static routing policies to route non-emergency calls from certain originations (e.g., a wholesale gateway requiring prepaid authorization for non-emergency calls) to pre-paid service controllers. If calls are either from and/or to IMS subscribers or IMS applications (or services) are invoked, BIGCF 122 may route the calls to the IMS core using I-CSCF 104 to invoke calling and/or called party features.

BIGCF 122 may include a group of configuration data. For example, BIGCF 122 may maintain a list of served hosts. If the request uniform resource indicator (R-URI) domain in the incoming request does not identify one of the served hosts, BIGCF 122 may either proxy the call externally to an address resolved by a Domain Name Service (DNS) service (SRV) record or reject the call by sending a session initiation protocol (SIP) 403 response (or other type of message), unless the call is an emergency call. In this way, BIGCF 122 may reject calls destined for unknown entities.

BIGCF 122 may also include a list of emergency prefixes on a per country basis. For example, BIGCF 122 may store the prefix 911 for the United States. BIGCF 122 may store a list of non-geographic numbers per country of origin (e.g., 800, 411, etc.). Via this list, BIGCF 122 may route calls directly for PSTN breakout.

BIGCF 122 may further store a list of originating hosts (e.g., gateway uniform resource locators (URLs)) from which calls may be expected. If a call is not from one of the hosts in the list of origination hosts (either in the second topmost via or first via), BIGCF 122 may reject the request. The originating host based data may include a number of data elements. For example, the data elements may include a gateway IP address of one or more hostnames. The originating hosts may point to prefix/suffix information to normalize the calling party number. For example, a wholesale gateway origination may have a rule indicating that if 7 digits are given in the calling party number, then prefix the calling party number with +1732. The suffix information may indicate how many digits to consider after the suffix.

The originating hosts may identify a location of the calling party identity indicators. For example, the originating hosts may identify from which header in a SIP INVITE message to retrieve the calling party information.

The data elements may also include the country or location of the gateway. This location may be used by BIGCF 122 to normalize the called party number, based on the country of origination of the call. The location of the gateway may also be used by BIGCF 122 to identify a location of a gateway to which an emergency call is to be routed.

The data elements may further include a list of blocked prefixes from each origination host. For example, 1900* may indicate that "1-900" calling is blocked from this gateway. The data elements may further include an outbound route for each origination host. For example, non-emergency calls from a given host may be routed to a configured host, such as a pre-paid service controller.

In addition to the above data, BIGCF 122 may be configured with the following data: a variable to either allow or reject processing of an INVITE where the request URI does not match one of the configured served hosts; an option per originating domain or IP address to accept or reject the request; an option to process certain SIP requests; a prefix per origination that is not allowed; static routing rules based on prefix matching; a server group pointing to a farm of ENUM servers; a server group pointing to a farm of I-CSCF servers for routing to the IMS core; a server group pointing to a farm of BGCF servers for bypassing the IMS core and routing directly to BGCF 120; a server group pointing to a farm of Emergency Services Positioning Servers (which may be part of the U.S. emergency service network); an option to specify that certain message(s) are to be directed to an error log or an on-screen display; an option to place a gateway in service and place a gateway out-of-service in BIGCF 122; country codes needed for number normalizations; number normalization rules (e.g., based on originating gateway); an option for enabling or disabling logging categories; an option for enabling or disabling alarms; and an option for enabling or disabling metrics.

In one implementation consistent with principles of the invention, BIGCF 122 may connect to I-CSCF 104, SLG 116, NGW 118, and BGCF 120 via SIP interfaces. Additionally, BIGCF 122 may connect to ENUM 146 via a DNS protocol interface.

C. Media Resource Function (MRF)

The IMS core may provide shared multimedia services. Examples of multimedia services (or applications) include playing announcements, audio/video recording and playback, Interactive Voice Response (IVR), fax reception and transmission, Automatic Speech Recognition (ASR), Text-To-Speech (TTS) session, multimedia conferencing, customized ring back tones, Push-to-talk Over Cellular (PoC), video messaging, etc. MRF 124 may be part of the IMS core and may support services that use multimedia streams.

As illustrated in FIG. 1, MRF 124 may include MRFC 126, MREP 128, and MRB 130. MRFC 126 and MRFP 128 are the IMS resources that provide support for bearer-related services (e.g., multi-party sessions, announcements to a user, bearer transcoding, etc.). MRFC 126 may provide bearer control-related services. MRFP 128 may provide user plane resources that may be requested and instructed by MRFC 126. MRB 130 may provide a resource management function that is able to allow media resources to become common resources shared among multiple applications.

D. Application Servers

Application Servers (AS) 132 may include one or more servers that provide enhanced audio, video, messaging and data services within the application layer of system 100. Application servers 132 may be accessible to the users of the IMS core and provide value added multimedia services to those users. Application servers 132 may submit charges to the IMS core for the services that application servers 132 provide to the IMS user community.

Two types of application servers 132 that may be used within system 100 may include micro applications and macro applications (or macro application services). Micro applications may be provided on a common services delivery platform through the use of SCE logic 134. Micro applications may include a wide variety of enhanced multimedia services that need a rapid development and deployment cycle. Macro application services may include Hosted IP CENTREX (HIPC) 136, Unified Messaging (UM) 138, and Carrier Application Service 140.

HIPC 136 may correspond to a type of Private Branch Exchange (PBX) service in which switching occurs at a local telephone office instead of at the company premises where the traditional PBX is located. In one implementation, HIPC 136 may be replaced by or supplemented with a SIP Voice Features server. Unified messaging 138 may allow users to be able to retrieve and send voice messages from a single interface, regardless of the technology (e.g., telephone, personal computer, etc.) and may provide other unified messaging services (e.g., fax deposit retrieval, voice to email, etc.). Carrier AS 140 may facilitate tool free call processing.

E. Services Creation Environment (SCE)

SCE logic 134 may provide a foundation for rapid development of next generation services. SCE 134 may support Java Specification Request (JSR) 116 SIP Servlet and a suite of externalized application programming interfaces (APIs) for developers to gain access to the IMS core. A single SCE 134 may support a number of macro application servers and may support the building of micro applications.

F. Services

The IMS core may support a number of different services, such as GLMS 142, Presence 144, and ENUM server 146. GLMS 142 may include one or more services that allow for group list creation, management, and use across multiple applications within the IMS core. GLMS 142 may enforce access and visibility rules. Presence 144 may include one or more services that automate the task of aggregating both presence and availability information. Presence 144 may inform one user about the status of another user's availability and willingness to communicate. Presence servers 144 may use a Presence User Agent (PUA) to manage the presence of the IMS subscribers and handle presence subscription requests. For example, an application or an IMS subscriber may act as a watcher, which is an entity that subscribes to presence information provided by Presence Server 144. ENUM server 146 may provide translation of E.164 to SIP URIs. BIGCF 122 and S-CSCF 102 may query ENUM server 146 to determine a next hop for a call. In some implementations consistent with principles of the invention, BIGCF 122 may execute ENUM queries for both calling and called number resolution.

G. Border Elements

The IMS core may include one or more Session Border Controllers (SBCs) that provide control of the boundary between different service provider networks, provide signaling protocol inter-working between the SIP-based IMS core and other service provider networks, control the transport boundary between service provider networks, and provide usage metering and Quality of Service (QoS) measurements for media flows. Two types of SBCs that may be associated with the IMS core are the Access Session Border Controller (A-SBC) 148 and the I-SBC 150.

A-SBC 148 may correspond to an ingress point to the IMS core for Customer Premises Equipment (CPE) traffic. A-SBC 148 may provide SIP aware firewall capabilities that support network address translation (NAT), prevent denial of service (DoS) attacks, and execute other security enforcement features. A-SBC 148 may be the first SIP events normalization point prior to the IMS core. In one implementation, A-SBC 148 may be replaced by or supplemented with a border gateway function.

Internetworking Session Border Controller (I-SBC) 150 may serve as a connection point between the IMS core and wholesale gateways and also between the IMS core and IP peering VoIP carriers. I-SBC 150 may provide SIP normalization and Topology Hiding and Internetwork Gateway (THIG) services. In one implementation, I-SBC 150 may be replaced by or supplemented with a Border Gateway Function (BGF).

H. Policy

System 100 may include a number of policy components. For example, system 100 may, as illustrated in FIG. 1, include a policy engine 152, a PDF 154, and a RM 156. Policy engine 152 may include one or more rule-based engines that govern subscriber access to the IMS core, subscriber access to resources, and routing decisions for several different types of event requests made within the IMS core. In one implementation, policy engine 152 may provide decision logic to decision and policy points within the IMS core. PDF 154 may correspond to a Policy Decision Point (PDP) for service-based local policy control. PDF 154 may make policy decisions based on session and media related information. PDF 154 may exchange this decision information with another IMS element (such as A-SBC 148 or I-SBC 150) to control the flow and characteristics of the communication link. RM 156 may be used to execute a policy at the component level. As illustrated in FIG. 1, RM (Resource Management) 156 may be associated with, for example, S-CSCF 102, BIGCF 122, A-SBC 148, and I-SBC 150. In one implementation, RM 156 may store and execute the policy decisions that are relevant for the location at which RM 156 is associated.

I. Charging Function (CF)

CF 158 may include a unified system for affecting both offline charging and online charging. Offline charging is a process where charging information for network resource usage is collected concurrently with that resource usage. The charging information may be passed through a chain of CFs 158. At the end of this process, Call Detail Record (CDR) files may be generated by the network, which may then be transferred to the network operator's billing domain for the purpose of subscriber billing processing, which may includes rating and rendering.

Online charging is a process where charging information can affect, in real time, the service rendered. Support of this capability may include direct interaction between the charging mechanism and the network's session control mechanism. An example of online charging includes pre-paid calling card usage.

CDF 160 may compile chargeable events gathered from IMS components into a single CDR for offline billing activities. CDF 160 may gather the chargeable events from a Charging Trigger Function (CTF) that may be associated with components of system 100 and, after creating the CDR, pass the billing data to the CGF 162.

CGF 162 may act as a gateway between both the offline charging system, the online system, and an external post-processing system, such as a billing domain.

J. The Generic User Profile (GUP)

Information related to IMS subscribers may be in many formats, managed by many network elements and administrations. This complicates access to that data for users, network elements, and value-added service providers. Generic User Profile (GUP) 164 addresses this problem, providing a common conceptual description of subscriber data. A GUP server may provide a means to access the data described in GUP 164.

Exemplary Configuration of BIGCF

Figure 2:
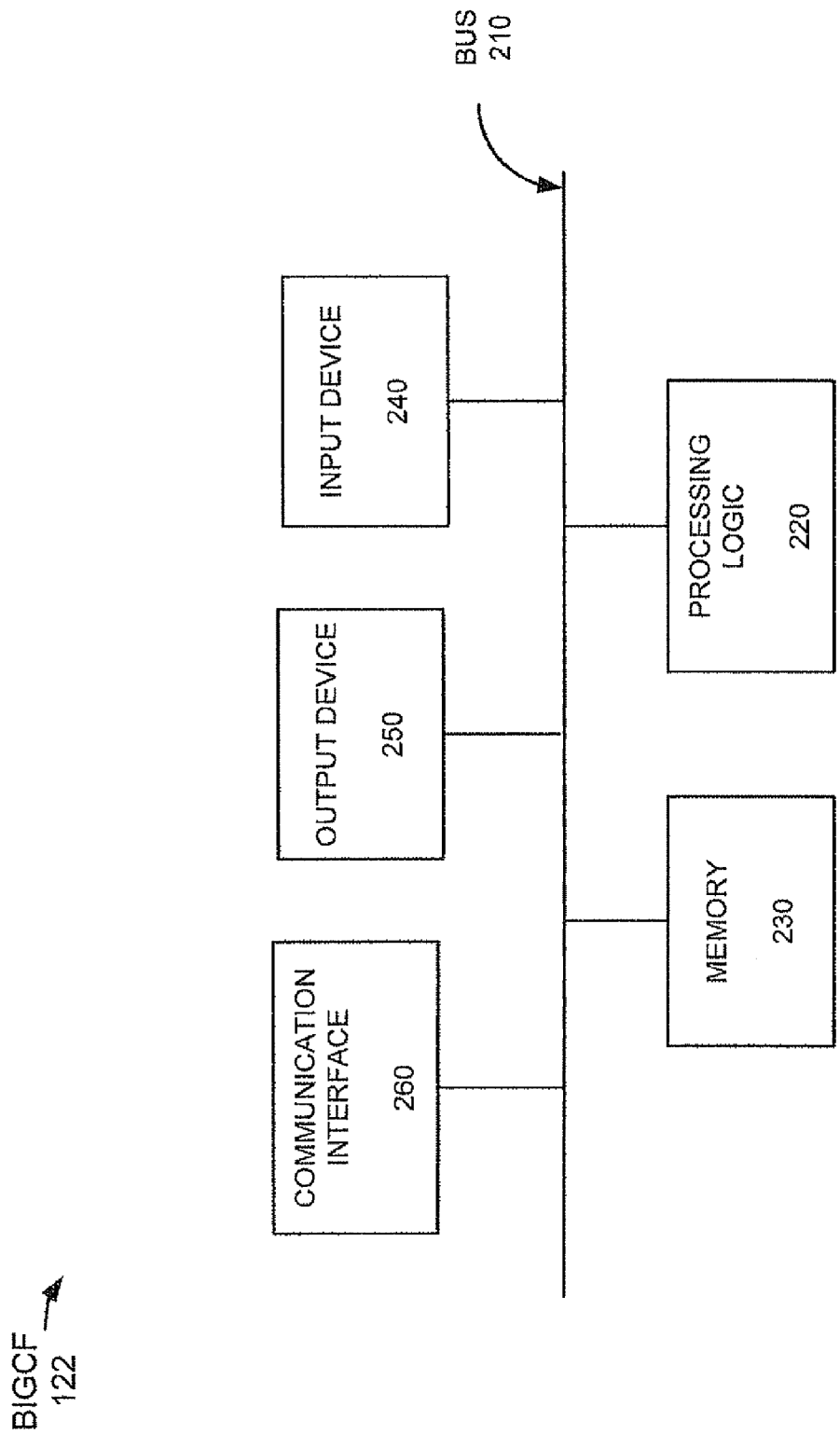
FIG. 2 illustrates an exemplary configuration of the break-in gateway control function (BIGCF) of FIG. 1.

FIG. 2 illustrates an exemplary configuration of BIGCF 122. As illustrated, BIGCF 122 may include a bus 210 processing logic 220 a memory 230 an input device 240, an output device 250, and a communication interface 260. It will be appreciated that BIGCF 122 may include other components (not shown) that aid in receiving, transmitting, and/or processing data. Moreover, it will be appreciated that other configurations are possible.

Bus 210 may permit communication among the components of BIGCF 122. Processing logic 220 may include any type of processor or microprocessor that interprets and executes instructions. In other implementations, processing logic 220 may be implemented as or include an Application Specific Integrated Circuit (ASIC), Field Programmable Gate Array (FPGA), or the like. Memory 230 may include a random access memory (RAM) or another type of dynamic storage device that stores information and instructions for execution by processing logic 220 a read only memory (ROM) or another type of static storage device that stores static information and instructions for the processing logic 220 and/or some other type of magnetic or optical recording medium and its corresponding drive for storing information and/or instructions.

Input device 240 may include a device that permits an operator to input information to BIGCF 122, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables BIGCF 122 to communicate with other devices and/or systems. For example, communication interface 260 may include mechanisms for communicating with other components within system 100.

As will be described in detail below, BIGCF 122 may perform processing associated with routing calls from and to non-IMS subscribers. BIGCF 122 may perform these and other functions in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 260. The software instructions contained in memory 230 may cause processing logic 220 to perform processes that will be described later. Alternatively, hardwired circuitry may be used in place of or in combination with software instructions to implement processes consistent with the principles of the invention.

Thus, systems and methods consistent with the principles of the invention are not limited to any specific combination of hardware circuitry and software.

Exemplary Process

Figure 3:
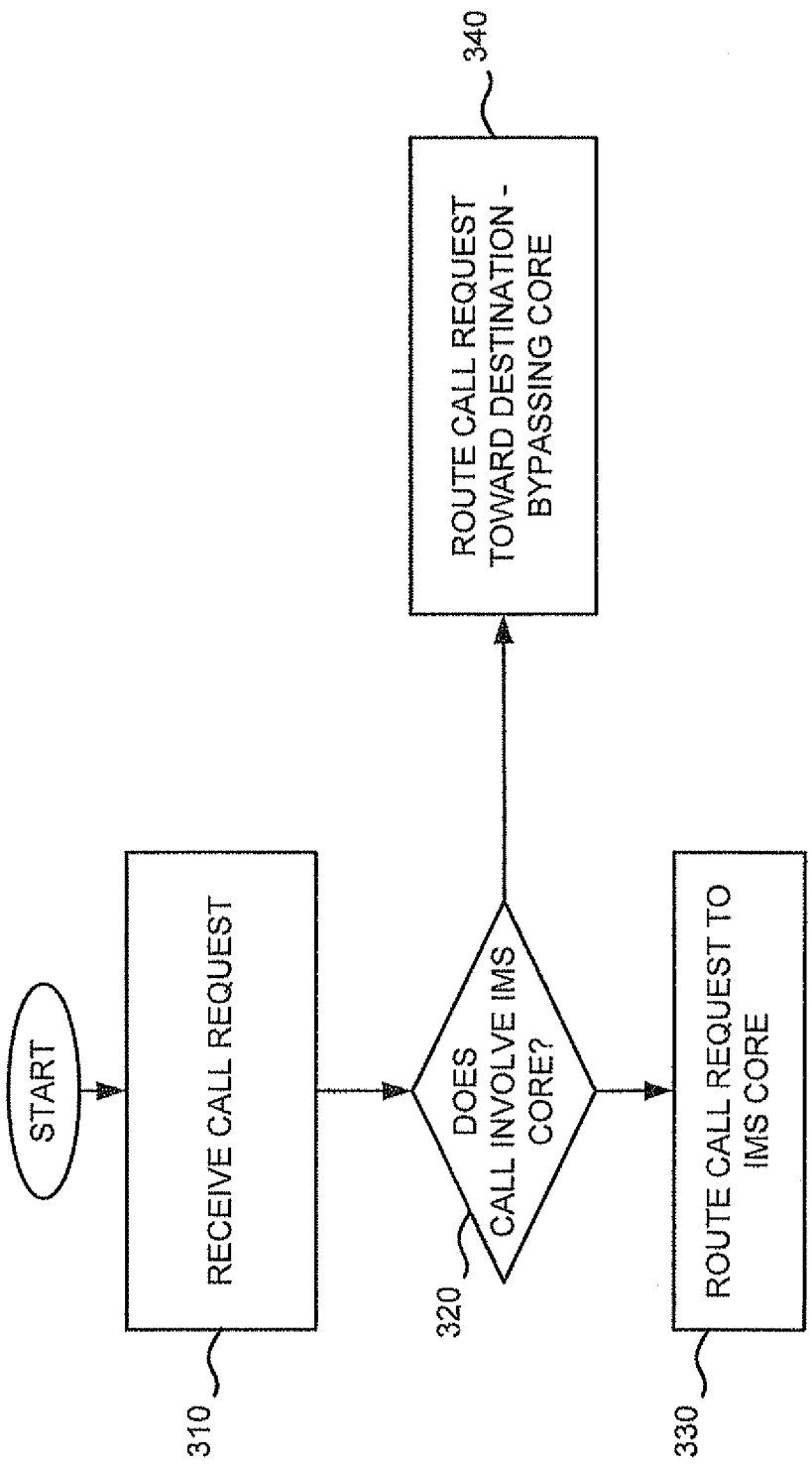
FIG. 3 illustrates an exemplary process performed by the BIGCF of FIG. 1.

FIG. 3 is a flowchart of an exemplary process for routing calls. The processing described in FIG. 3 may be implemented by BIGCF 122. Processing may begin with BIGCF 122 receiving a call request (act 310). BIGCF 122 may receive the call request from, for example, a Class 3 (PSTN long distance) network, a Class 5 (PSTN local exchange) network, a wholesale subscriber, a prepaid application controller, or from other IP carriers.

BIGCF 122 may determine whether the call involves the IMS core (act 320). To make this determination, BIGCF 122 may send a query to ENUM server 146 to determine if the calling party number is served by the IMS core. For example, if the calling party number is associated with an IMS profile that invokes an IMS application, BIGCF 122 may determine that the call involves the IMS core. BIGCF 122 may send a query to ENUM server 146 to determine if the called party number is served by the IMS core. For example, if the called party number is associated with an IMS subscriber or is associated with an IMS profile that invokes an IMS application, BIGCF 122 may determine that the call involves the IMS core. On the other hand, if the call does not involve an IMS application or is not destined for an IMS subscriber, BIGCF 122 may determine that the call does not involve the IMS core.

If BIGCF 122 determines that the call involves the IMS core, BIGCF 122 may route the call request to the IMS core to perform origination and/or termination IMS services (act 330). BIGCG 122 may, for example, forward the call request to I-CSCF 104 of the IMS core for forwarding to the appropriate S-CSCF 102 for processing. S-CSCF 102 may invoke the appropriate IMS service(s) and/or forward the call request toward the appropriate IMS subscriber.

If, on the other hand, BIGCF 122 determines that the call does not involve the IMS core, BIGCF 122 may route the call request toward the appropriate destination, bypassing the IMS core (act 340). BIGCF 122 may, for example, forward the call request to BGCF 120 for routing to an appropriate PSTN termination point or to an appropriate I-SBC 150 for routing to a wholesale or IP-based carrier termination point.

Figure 4A:
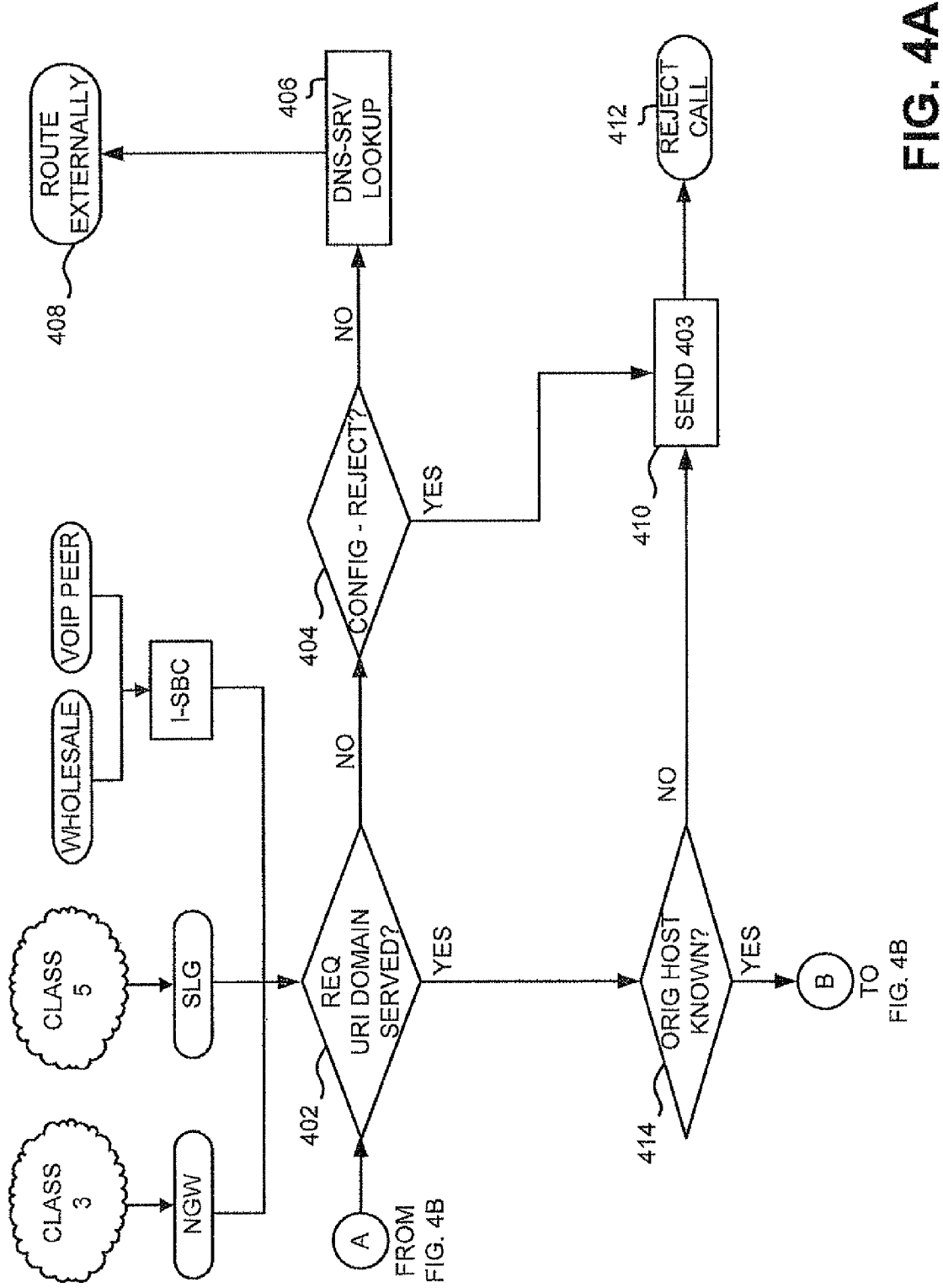
FIGS. 4A-4C illustrate the processing of FIG. 3 in additional detail.
Figure 4B:
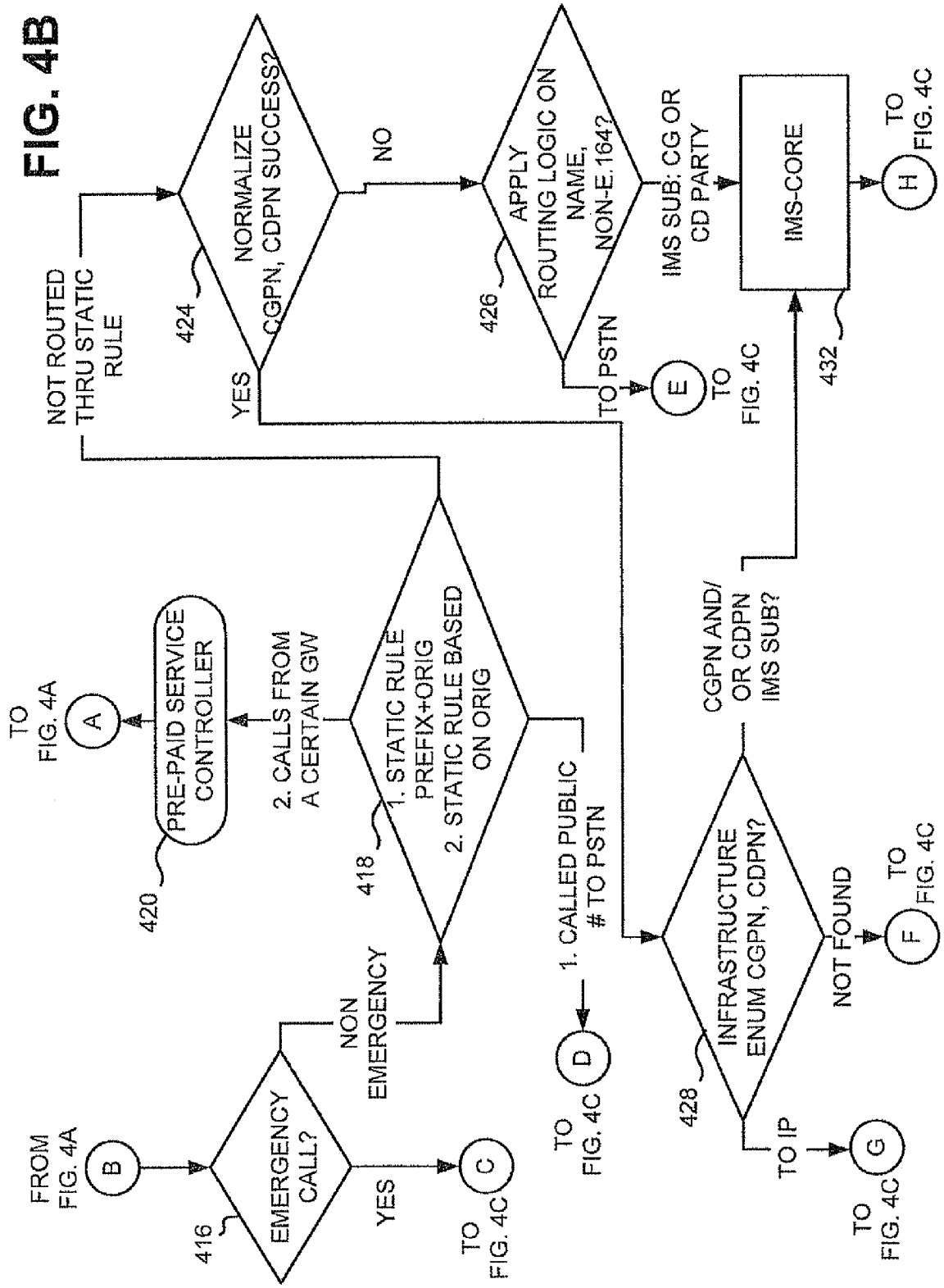
Figure 4C:
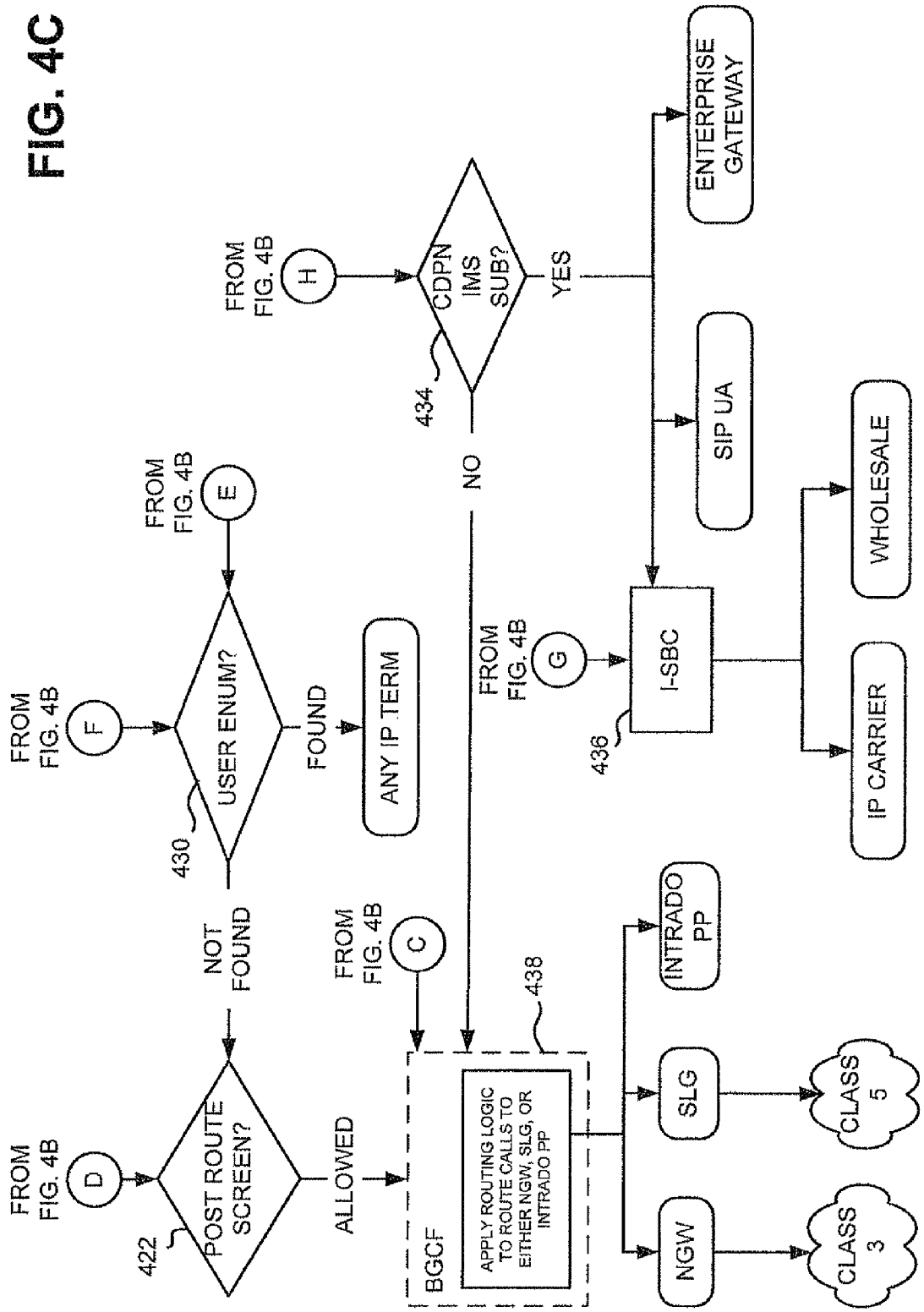

FIGS. 4A-4C are flowcharts of an exemplary process for routing calls. The processing described in FIGS. 4A-4C may be performed by BIGCF 122. Processing may begin with BIGCF 122 determining whether a received call request is associated with a served domain (act 402). To make this determination, BIGCF 122 may look up the domain portion of the request URI in a list of domains served by the IMS core. If the domain is not on the list, BIGCF 122 may route the call externally to the address resolved by the DNS-SRV (acts 404, 406, 408), unless the call is determined to be an emergency call. BIGCF 122 may reject the call instead of routing externally, in the case of no match by sending a SIP 403 response or another type of response (acts 404, 410, 412).

If the call request is associated with a served domain, BIGCF 122 may determine if the originating host is known (act 414). For example, BIGCF 122 may compare the originating host to a list of originating hosts. If the originating host does not match a host in the list of originating hosts, BIGCF 122 may reject the call by sending a SIP 403 response or another type of response (acts 410, 412).

BIGCF 122 may analyze the user portion of the Request URI and if it is a numeric string, BIGCF 122 may look up this numeric string in a list of emergency numbers for a country, which is associated with an originating host (act 414 and act 416, FIG. 4B). BIGCF 122 may route emergency calls to BGCF 120 bypassing the IMS core (act 416). When the call is determined to be an emergency call, BIGCF 122 may insert an emergency call indicator.

For non-emergency calls, BIGCF 122 may apply static routing rules based on the originating hosts (act 418). For example, regardless of the prefix, BIGCF 122 may route calls from a given host to a configured address. For example, BIGCF 122 may route calls from a certain gateway to a pre-paid service controller (act 420). BIGCF 122 may also block calls from certain originations. For example, BIGCF 122 may block non-emergency calls from an Emergency Services Peering Point.

In one implementation, BIGCF 122 may support a routing policy where BIGCF 122 routes a called number matching a prefix in a list of prefixes directly to BGCF 120 (act 418). This list of prefixes (e.g., non-geographic numbers) may be specific to a country, and may be configurable per originating host. As an example, if the IMS does not provide the associated freephone service, BIGCF 122 may route "1-800" calls directly to BGCF 120.

After applying static routing rules based on prefix, origination, or a combination of both (act 418), BIGCF 122 may apply call post screening processing based on configured rules on the originating party domain or IP address coupled with the dialed digits (called party identity) (act 422, FIG. 4C). As one example, a rule may cause BIGCF 122 to reject any call if the identified prefix per originating domain is configured to be blocked.

When the call is not routed through a static rule, BIGCF 122 may perform calling party number (CgPN) normalization based on the entity that originated the call (act 424, FIG. 4B). In this situation, normalization rules may be configured corresponding to the originating gateways. In some situations, the normalization may not result in an E.164 format (e.g., if the calling party identity is not normalizable or specific rules per originating gateways are not available).

BIGCF 122 may normalize the called party number (CdPN) (e.g., adding or stripping digits, adding "+", etc.) based on rules for the country code from the calling party number and the dialed digits (act 424). For example, if the calling party is in the United States and the calling party number has 10 digits, the prefix "+1" may be added. In some situations, an E.164 format may not be achieved if the called party identity is not normalizable.

If BIGCF 122 successfully normalizes the called party number (act 424), BIGCF 122 may put the normalized number in a Request URI for ENUM 146 resolution and may save the originally dialed digits for possible eventual consumption by BGCF 120. In one implementation consistent with principles of the invention, BIGCF 122 may save the originally dialed digits, from the received request URI, in the History-Info header of the request.

BIGCF 122 may select an outbound route (e.g., a route to I-CSCF 104, BGCF 120, or I-SBC 150), in cases where the calling and/or called party numbers are not in E.164 format (act 426). Table 1 provides possible route selections that may be performed by BIGCF 122.

TABLE 1

BIGCF Routing For Non-E.164 Calling/Called Party Identities

| Calling Party | Called Party | Actions |
|---|---|---|
| E.164 | E.164 | Route based on URIs obtained via Infrastructure ENUM queries (act 428). |
| E.164 | Non-Normalizable into E.164 | 1. Route to I-CSCF 104 if calling party lookup in infrastructure ENUM query results in a SIP URI pointing to I-CSCF 104 (i.e., the IMS core), with Route header: <sip:icscf address;mode=orig;lr>, to indicate I-CSCF 104 to route based on origination party to S-CSCF 102.<br>2. Route to I-CSCF 104. R-URI: called party (no change)<br>Route Header: none (routing for terminating services only)<br>History-Info: none (because R-URI is unchanged)<br>P-Asserted-Identity: Calling Party (E.164)<br>3. If the called party is associated with a non-geographic prefix matching a prefix in a list of prefixes associated with the call's origination, as described above, BIGCF 122 may route the call to BGCF 120, with no change in the R-URI, and no Route and History-Info required. |
| E.164 | Name (alphanumeric characters in the user portion of R-URI) | 1. Route to I-CSCF 104.<br>R-URI: called party (no change)<br>Route Header: none (routing for terminating services only)<br>History-Info: none (because R-URI is unchanged)<br>P-Asserted-Identity: Calling Party (E.164) |
| Non-E.164 | E.164 | Perform ENUM lookup for called party only, using configured top-level domain for infrastructure ENUM 146. If response SIP URI from ENUM points to:<br>1. I-CSCF 104: route to IMS core, with R-URI: SIP URI from ENUM, History-Info: original dialed digits, with no route header<br>2. Wholesale/VoIP Peer: route to associated I-SBC 150 (as described further below), with R-URI: SIP URI from ENUM, and with a Route header pointing to I-SBC (as a single outbound route). No History-Info is required.<br>3. NXDOMAIN: E.164 lookup returned no result. Perform User ENUM query using configured domain per originating address (act 430, FIG. 4C). If there is any SIP URI returned from this query, BIGCF 122 may directly route the call to the address returned in the host part of the SIP URI. In case of no response, BIGCF 122 may perform one more ENUM query using top-level e164.arpa domain, and route the call to the address returned in SIP URI from ENUM. If this also does not return a response, then:<br>Route to BGCF 120 for a possible PSTN breakout, with R-URI: E.164 number, History-Info: original dialed digits (if the called party number has been normalized into E.164).<br>4. VOID: called party number out of service, reject the call. |
| Non-E.164 | Non-E.164 | Route the call to I-CSCF 104 for possible terminating feature invocation. |
| Non-E.164 | Name (alphanumeric string) | Route the call to I-CSCF 104 for possible terminating feature invocation. |

Assume that BIGCF 122 receives the call request from SLG 116, NGW 118, or I-SBC 150. BIGCF 122 may generate two DNS Naming Authority Pointer (NAPTR) queries towards ENUM 146 if the called and calling party numbers are in E.164 format (acts 424, 428, FIG. 4B). Table 2 provides an exemplary list of queries and possible responses to those queries. BIGCF 122 may maintain a routing table to identify an I-SBC 150 to which the call is to be forwarded based on the host part of the SIP URIs returned from ENUM 146. The host part may identify the wholesale or VoIP peer gateway. In case of IMS core terminations, the returned ENUM response may identify an I-CSCF 104 to which the call is to be forwarded.

TABLE 2

ENUM Queries

| Query | DNS NAPTR Query at ENUM | Query Response |
|---|---|---|
| A | CgPn.<configured infrastructure ENUM top level domain> e.g., 4.2.3.1.8.4.5.2.7.9.1.foo.bar | 1. SIP URI pointing to I-CSCF 104. sip:<number>@icscf1.us.Verizon.com. 2. SIP URI pointing to VoIP wholesaler interconnect gateway. sip:<number>@gw1.wholesaler.com. |
| B | CdPn.<configured infrastructure ENUM top level domain> e.g., 3.2.3.1.5.6.3.2.7.9.1.foo.bar | 3. SIP URI pointing to VoIP peering partner interconnect gateway. sip:<number>@gw1.voippeer.com. 4. NXDOMAIN: This response means that no translation information was found for the specified number. 5. VOID: This indicates that the specified number is out of service. |
| User ENUM Query | CdPn.e164.arpa e.g., 3.2.3.1.5.6.3.2.7.9.1.e164.arpa | 1. SIP URI pointing to any IP termination. 2. NXDOMAIN: no record found. 3. VOID: number out of service. |

BIGCF 122 may use the above responses from the two NAPTR queries to route calls to the IMS core (e.g., towards I-CSCF 104) or bypassing the IMS core (I-SBC 150). Table 3 below describes how a call is routed at BIGCF 122, based on the responses received from ENUM server 146 to the above two queries.

If no records exist for the NAPTR queries, BIGCF 122 may query the user ENUM. If there is a SIP URI returned from this query, BIGCF 122 may directly route the call to the address indicated in the host part of the SIP UPI. If this does not return a valid URI, then BIGCF 122 may route the call to BGCF 120 (act 438).

TABLE 3

ENUM Query Responses Affecting Routing at BIGCF

| Calling Party ENUM Response | Called Party ENUM Response | Actions |
|---|---|---|
| n/a | VOID | Reject the call. Called number is out of service. |
| NXDOMAIN OR VOID OR Wholesale or VoIP peer gateway URI | SIP URI Type: I-CSCF | Route to I-CSCF 104. R-URI: SIP URI from ENUM 146 for called party. Route header: none. History-Info header: original R-URI (used in ENUM query) |
| NXDOMAIN OR VOID OR Wholesale or VoIP peer gateway URI | SIP URI Type: Wholesale or VoIP peer gateway | Route to I-SBC 150. R-URI: SIP URI from ENUM 146 for called party. Route header: <I-SBC address;lr> History-Info: original R-URI (used in ENUM query) |
| NXDOMAIN OR VOID OR Wholesale or VoIP peer gateway URI | NXDOMAIN | Perform User ENUM query. If there is a SIP URI returned from this query, BIGCF 122 may directly route the call to the address returned in the host part of the SIP URI. If this does not return a response, then: Route to BGCF 120 if not from SLG 116. All headers unchanged. PSTN breakout. |
| SIP URI Type: I-CSCF | NXDOMAIN OR SIP URI (any type) | Route to I-CSCF 104. R-URI: SIP URI from ENUM 146 for called party or no change if response from ENUM is NXDOMAIN Route header: <sip:icscf address;mode=orig;lr>, where icscf address is returned from ENUM query for calling party. History-Info: None or original dialed digits if RURI is changed. P-Asserted-Identity: SIP URI returned from ENUM for calling party. |
| SIP URI Type: wholesale | NXDOMAIN | Perform User ENUM query. If a SIP URI is returned from this query, BIGCF 122 may directly route the call to the address returned in the host part of the SIP URI. If no response is returned, then: Route to BGCF 120. R-URI: no change, Route: none, History-Info: none. P-Asserted-Identity: SIP URI returned from ENUM for calling party |

Once BIGCF 122 finds the route to be used for a call, BIGCF 122 may perform post route selection screening (act 422, FIG. 4C) to check if the selected route is allowed. BIGCF 122 may route the call based on above queries to either I-CSCF 104 in the IMS core, towards BGCF 120, or towards I-SBC 150 for IP-based termination points (act 432, FIG. 4B; acts 434, 436, 438, FIG. 4C).

EXAMPLES

Figure 5:
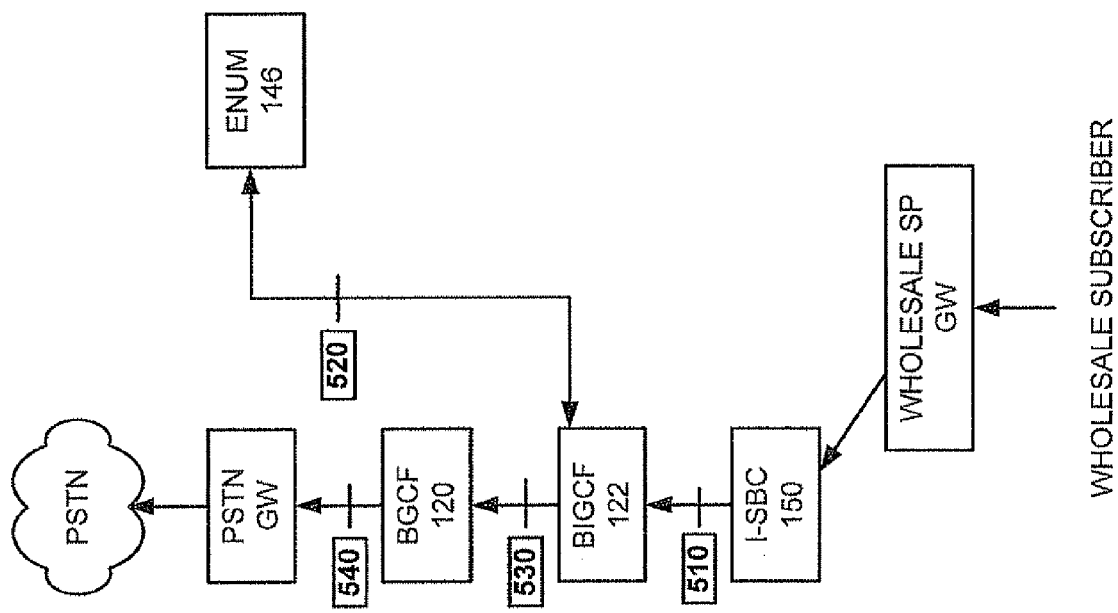
FIGS. 5-12 illustrate examples of the processing described in FIGS. 3 and 4A-4C.

The following examples illustrate the processing described above with respect to FIGS. 3 and 4A-4C. FIG. 5 illustrates exemplary processing for routing a call from a wholesale subscriber to a PSTN termination point. In this example, assume that neither the calling party (i.e., the wholesale subscriber) nor the called party (i.e., the PSNT termination point) invokes an IMS-based application.

As illustrated in FIG. 5, the call may be received from the wholesale subscriber at a wholesale service provider (SP) gateway (GW) with which the wholesale subscriber is associated. The wholesale service provider gateway may forward the call to I-SBC 150 of system 100.

Processing may begin with BIGCF 122 receiving the call from I-SBC 150 (act 510). In response to receiving the call, BIGCF 122 may query ENUM server 146 (e.g., using a NAPTR DNS query) based on the calling party number to determine whether the calling party is served by the IMS core (act 520). If the calling party is served by the IMS core, the response from ENUM server 146 may include information identifying an I-CSCF 104 for the IMS core. If, on the other hand, the calling party is not served by the IMS core, the response from ENUM server 146 may include a NXDOMAIN (indicating that no record has been found in ENUM server 146) or similar response code. BIGCF 122 may also query ENUM server 146 (e.g., using a NAPTR DNS query) based on the called party number to determine whether the called party is served by the IMS core (act 520). If the called party is served by the IMS core, the response from ENUM server 146 may include information identifying an I-CSCF 104 for the IMS core. If, on the other hand, the called party is not served by the IMS core, the response from ENUM server 146 may include a NXDOMAIN or similar response code.

In this example, BIGCF 122 may determine that the call is to be directed to a PSTN termination point and that no IMS application is to be invoked. BIGCF 122 may route the call to BGCF 120 (act 530). BGCF 120 may identify a PSTN egress gateway for the call and route the call to the identified PSTN egress gateway (act 540). The PSTN egress gateway may then route the call to the appropriate PSTN termination point. Therefore, in this example, BIGCF 122 may cause the call to bypass the IMS core.

Figure 6:
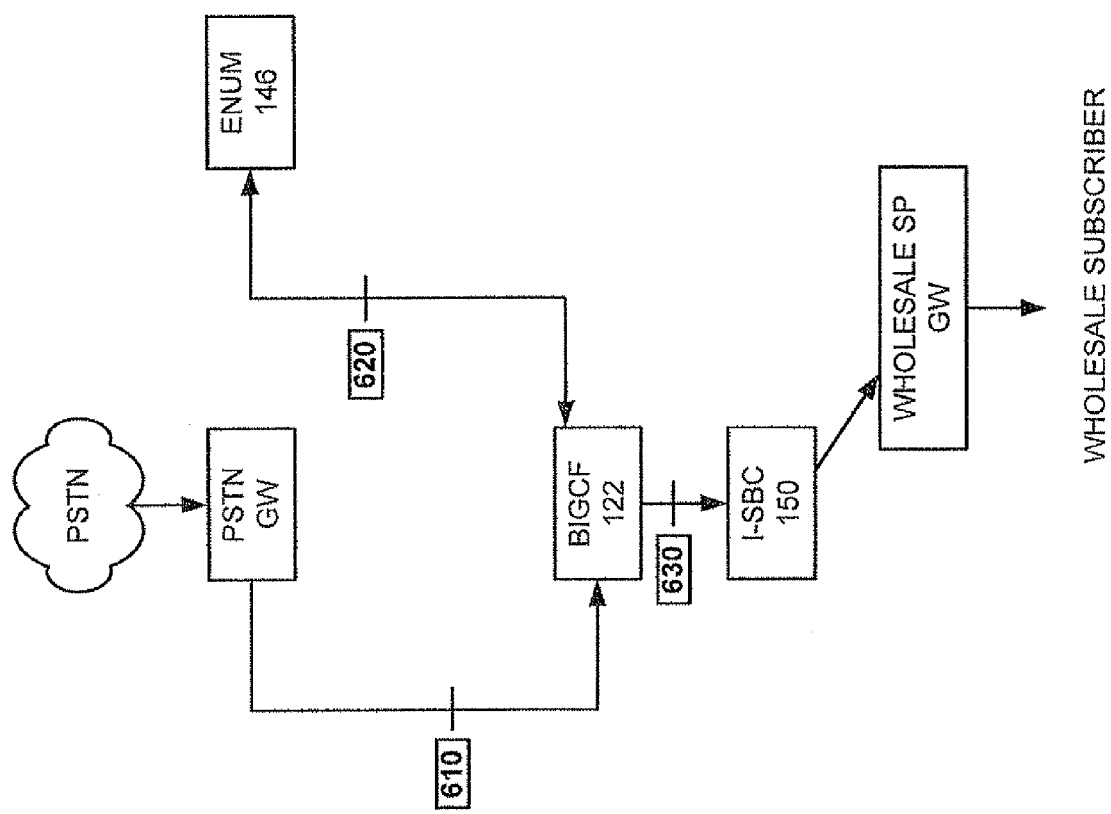

FIG. 6 illustrates exemplary processing for routing a call from a PSTN origination point to a wholesale subscriber. In this example, assume that neither the calling party (i.e., the PSTN origination point) nor the called party (i.e., the wholesale subscriber) invokes an IMS-based application.

As illustrated in FIG. 6, the call may be received from the calling party at a PSTN gateway (GW). The PSTN gateway may forward the call to BIGCF 122.

Processing may begin with BIGCF 122 receiving the call from the PSTN gateway (act 610). In response to receiving the call, BIGCF 122 may query ENUM server 146 (e.g., using a NAPTR DNS query) based on the calling party number to determine whether the calling party is served by the IMS core (act 620). If the calling party is served by the IMS core, the response from ENUM server 146 may include information identifying an I-CSCF 104 for the IMS core. If, on the other hand, the calling party is not served by the IMS core, the response from ENUM server 146 may include a NXDOMAIN or similar response code. BIGCF 122 may also query ENUM server 146 (e.g., using a NAPTR DNS query) based on the called party number to determine whether the called party is served by the IMS core (act 620). If the called party is served by the IMS core, the response from ENUM server 146 may include information identifying an I-CSCF 104 for the IMS core. It on the other hand, the called party is not served by the IMS core, the response from ENUM server 146 may include a NXDOMAIN or similar response code.

In this example, BIGCF 122 may determine that the call is to be directed to a wholesale service provider gateway and that no IMS application is to be invoked. BIGCF 122 may determine an egress point (e.g., I-SBC 150) through which to access the wholesale service provider gateway identified in the ENUM response, and route the call via that I-SBC 150 (act 630) to the wholesale service provider gateway. The wholesale service provider gateway may then route the call to the appropriate wholesale subscriber. Therefore, in this example, BIGCF 122 may cause the call to bypass the IMS core.

Figure 7:
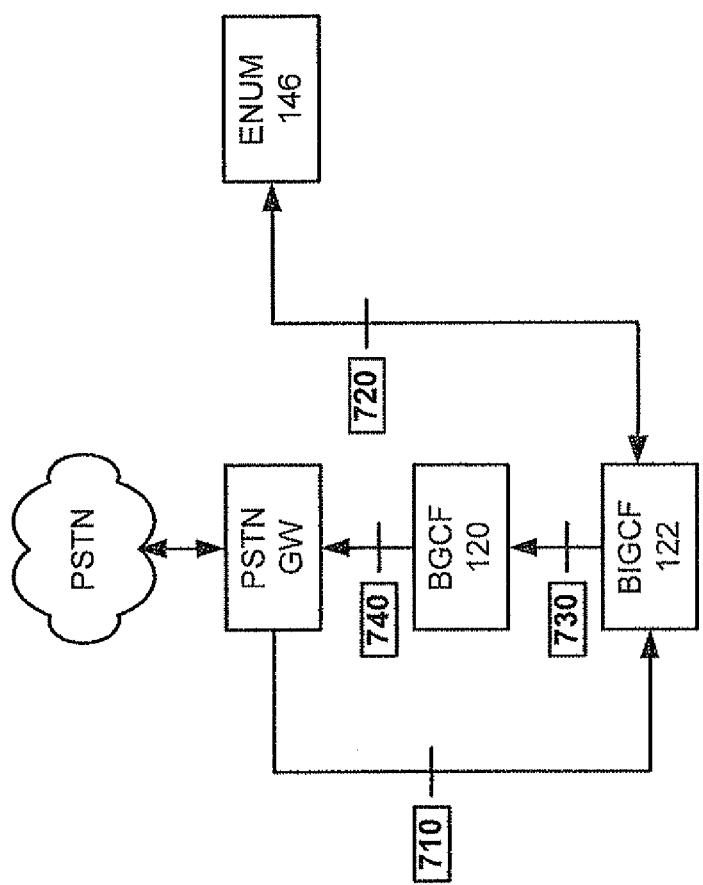

FIG. 7 illustrates exemplary processing for routing a call from a PSTN origination point to a PSTN termination. In this example, assume that neither the calling party (i.e., the PSTN origination point) nor the called party (i.e., the PSTN termination point) invokes an IMS-based application.

As illustrated in FIG. 7, the call may be received from the calling party at a PSTN gateway. The PSTN gateway may forward the call to BIGCF 122.

Processing may begin with BIGCF 122 receiving the call from the PSTN gateway (act 710). In response to receiving the call, BIGCF 122 may query ENUM server 146 (e.g., using a NAPTR DNS query) based on the calling party number to determine whether the calling party is served by the IMS core (act 720). If the calling party is served by the IMS core, the response from ENUM server 146 may include information identifying an I-CSCF 104 for the IMS core. If, on the other hand, the calling party is not served by the IMS core, the response from ENUM server 146 may include a NXDOMAIN or similar response code. BIGCF 122 may also query ENUM server 146 (e.g., using a NAPTR DNS query) based on the called party number to determine whether the called party is served by the IMS core (act 720). If the called party is served by the IMS core, the response from ENUM server 146 may include information identifying an I-CSCF 104 for the IMS core. If, on the other hand, the called party is not served by the IMS core, the response from ENUM server 146 may include a NXDOMAIN or similar response code.

In this example, BIGCF 122 may determine that the call is to be directed to a PSTN termination point and that no IMS application is to be invoked. BIGCF 122 may route the call to BGCF 120 (act 730). BGCF 120 may identify a PSTN egress gateway for the call (which may be the same PSTN gateway that received the call or a different PSTN gateway) and route the call to the identified PSTN egress gateway (act 740). The PSTN egress gateway may then route the call to the appropriate PSTN termination point. Therefore, in this example, BIGCF 122 may cause the call to bypass the IMS core.

Figure 8:
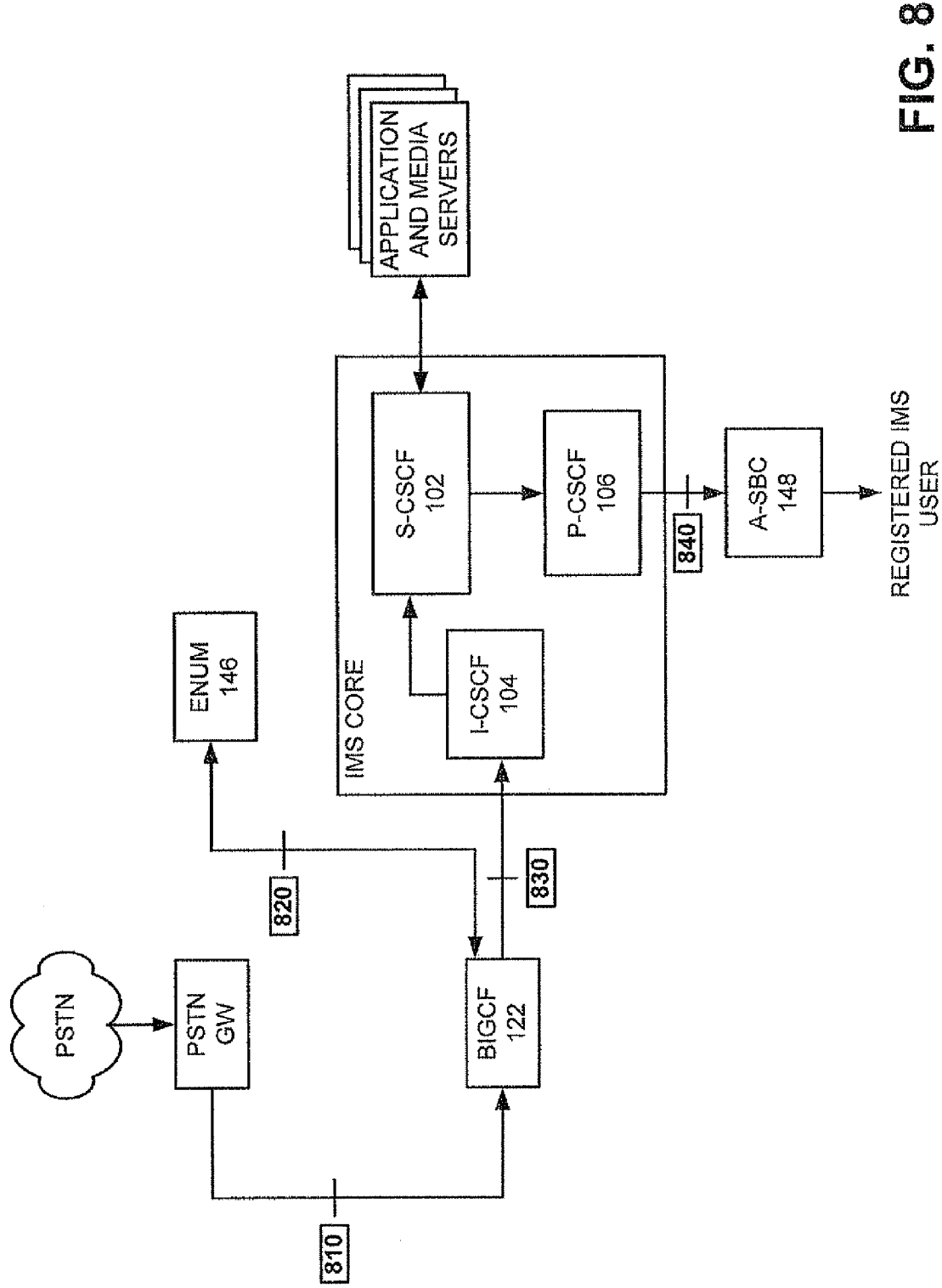

FIG. 8 illustrates exemplary processing for routing a call from a PSTN origination point to an IMS user. As illustrated in FIG. 8, the call may be received from the calling party (i.e., the PSTN origination point) at a PSTN gateway. The PSTN gateway may forward the call to BIGCF 122.

Processing may begin with BIGCF 122 receiving the call from the PSTN gateway (act 810). In response to receiving the call, BIGCF 122 may query ENUM server 146 (e.g., using a NAPTR DNS query) based on the calling party number to determine whether the calling party is served by the IMS core (act 820). If the calling party is served by the IMS core, the response from ENUM server 146 may include information identifying an I-CSCF 104 for the IMS core. If, on the other hand, the calling party is not served by the IMS core, the response from ENUM server 146 may include a NXDOMAIN or similar response code. BIGCF 122 may also query ENUM server 146 (e.g., using a NAPTR DNS query) based on the called party number to determine whether the called party is served by the IMS core (act 820). If the called party is served by the IMS core, the response from ENUM server 146 may include information identifying an I-CSCF 104 for the IMS core. If, on the other hand, the called party is not served by the IMS core, the response from ENUM server 146 may include a NXDOMAIN or similar response code.

In this example, BIGCF 122 may determine that the called party is served by the IMS core. Thus, the response from ENUM server 146 may include information for routing the call to I-CSCF 104 of the IMS core. BIGCF 122 may route the call to I-CSCF 104 (act 830). I-CSCF 104 may route the call to the appropriate S-CSCF 102, which may retrieve information relating to the called party (e.g., a profile from HSS 108 (not shown)). S-CSCF 102 may forward the call to the A-SBC 148 with which the IMS user is associated (act 840). Therefore, in this example, BIGCF 122 may route the call through the IMS core.

Figure 9:
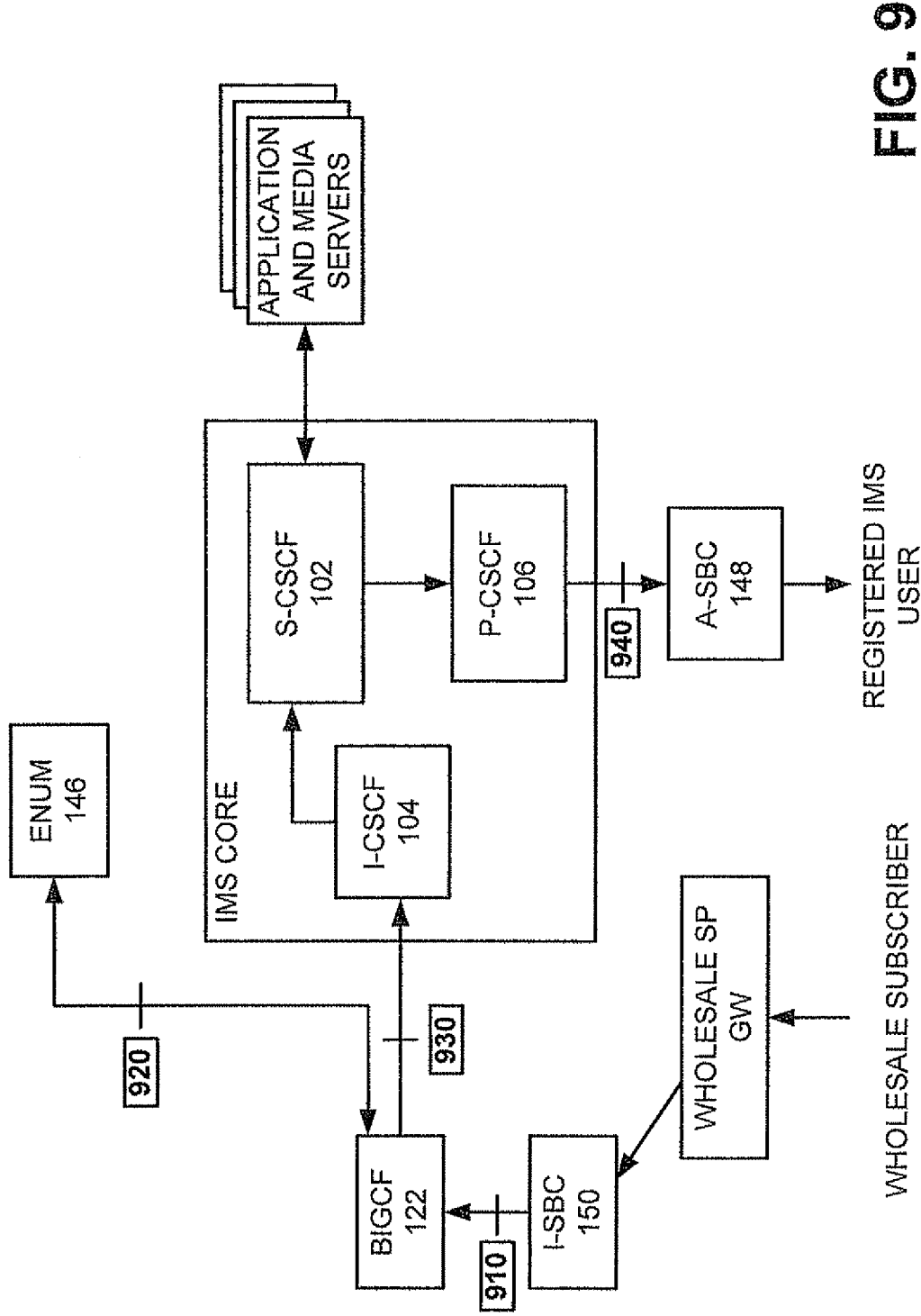

FIG. 9 illustrates exemplary processing for routing a call from a wholesale subscriber to an IMS subscriber. As illustrated in FIG. 9, the call may be received from the wholesale subscriber at a wholesale service provider (SP) gateway (GW). The wholesale service provider gateway may forward the call to I-SBC 150 of system 100.

Processing may begin with BIGCF 122 receiving the call from I-SBC 150 (act 910). In response to receiving the call, BIGCF 122 may query ENUM server 146 (e.g., using a NAPTR DNS query) based on the calling party number to determine whether the calling party is served by the IMS core (act 920). If the calling party is served by the IMS core, the response from ENUM server 146 may include information identifying an I-CSCF 104 for the IMS core. If, on the other hand, the calling party is not served by the IMS core, the response from ENUM server 146 may include a NXDOMAIN or similar response code. BIGCF 122 may also query ENUM server 146 (e.g., using a NAPTR DNS query) based on the called party number to determine whether the called party is served by the IMS core (act 920). If the called party is served by the IMS core, the response from ENUM server 146 may include information identifying an I-CSCF 104 for the IMS core. If, on the other hand, the called party is not served by the IMS core, the response from ENUM server 146 may include a NXDOMAIN or similar response code.

In this example, BIGCF 122 may determine that the called party is served by the IMS core. Thus, the response from ENUM server 146 may include information for routing the call to I-CSCF 104 of the IMS core. BIGCF 122 may route the call to I-CSCF 104 (act 930). I-CSCF 104 may route the call to the appropriate S-CSCF 102, which may retrieve information relating to the called party (e.g., a profile from HSS 108 (not shown)). S-CSCF 102 may forward the call to the A-SBC 148 with which the IMS user is associated (act 940). Therefore, in this example, BIGCF 122 may route the call through the IMS core.

Figure 10:
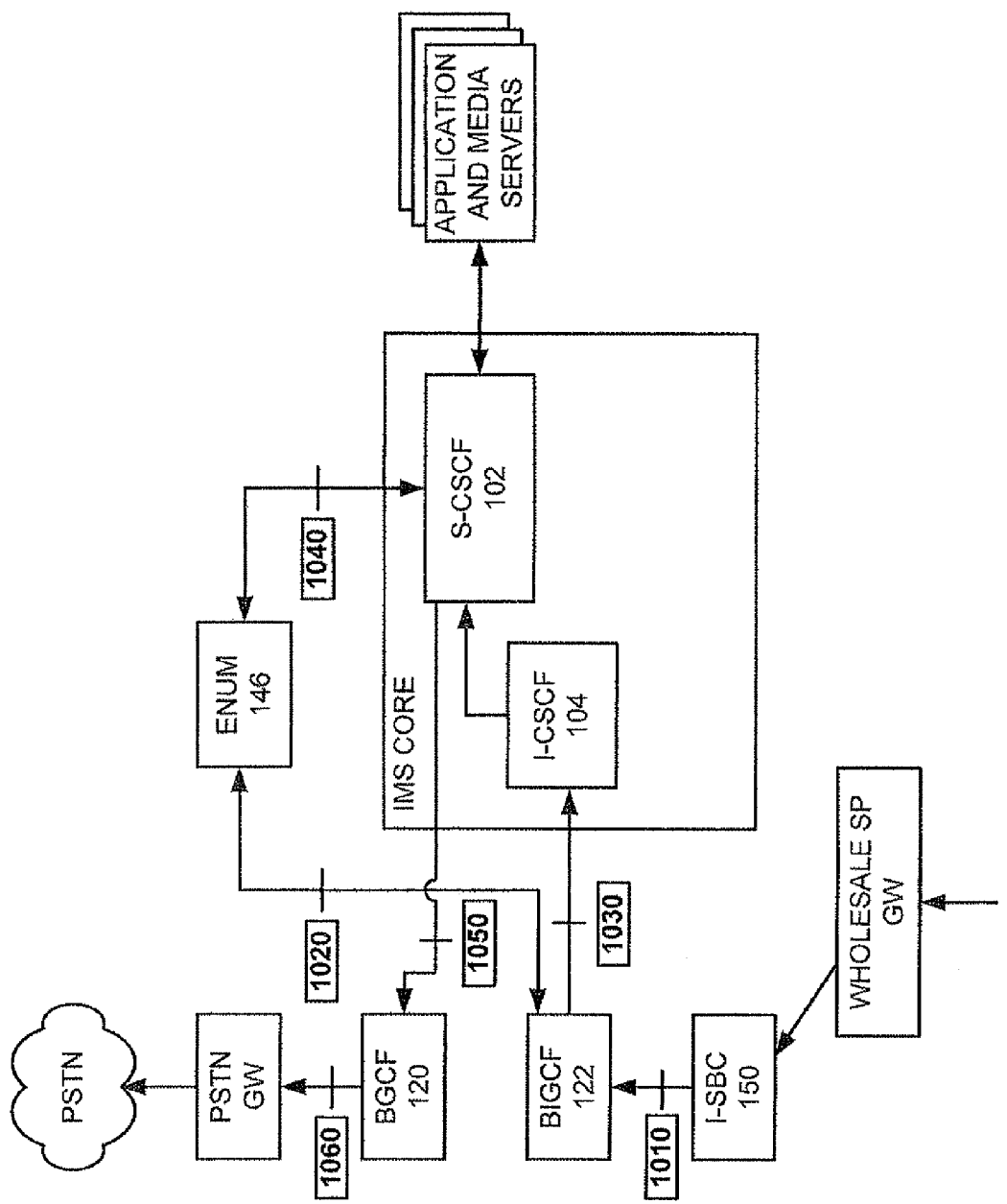

FIG. 10 illustrates exemplary processing for routing a call from a wholesale subscriber to a PSTN termination point in another implementation consistent with principles of the invention. In this example, assume that either the calling party (i.e., the wholesale subscriber) and/or the called party (i.e., the PSTN termination point) invokes an IMS-based application.

As illustrated in FIG. 10, the call may be received from the wholesale subscriber at a wholesale service provider gateway. The wholesale service provider gateway may forward the call to I-SBC 150 of system 100.

Processing may begin with BIGCF 122 receiving the call from I-SBC 150 (act 1010). In response to receiving the call, BIGCF 122 may query ENUM server 146 (e.g., using a NAPTR DNS query) based on the calling party number to determine whether the calling party is served by the IMS core (act 1020). If the calling party is served by the IMS core, the response from ENUM server 146 may include information identifying an I-CSCF 104 for the IMS core. It on the other hand, the calling party is not served by the IMS core, the response from ENUM server 146 may include a NXDOMAIN or similar response code. BIGCF 122 may also query ENUM server 146 (e.g., using a NAPTR DNS query) based on the called party number to determine whether the called party is served by the IMS core (act 1020). If the called party is served by the IMS core, the response from ENUM server 146 may include information identifying an I-CSCF 104 for the IMS core. If, on the other hand, the called party is not served by the IMS core, the response from ENUM server 146 may include a NXDOMAIN or similar response code.

In this example, BIGCF 122 may determine that the call is to be directed to the IMS core. Thus, the response from ENUM server 146 may include information for routing the call to I-CSCF 104 of the IMS core. BIGCF 122 may route the call to I-CSCF 104 (act 1030). I-CSCF 104 may route the call to S-CSCF 102, which may perform the necessary application invocation. Since the call is directed to a PSTN termination point, S-CSCF 102 may query ENUM server 146 to map the called party number to a SIP URI (act 1040). S-CSCF 102 may route the call with the SIP URI to BGCF 120 (act 1050).

BGCF 120 may identify a PSTN egress gateway for the call and route the call to the identified PSTN egress gateway (act 1060). The PSTN egress gateway may then route the call to the appropriate PSTN termination point. Therefore, in this example, BIGCF 122 may route the call through the IMS core for invoking one or more IMS applications for the call.

Figure 11:
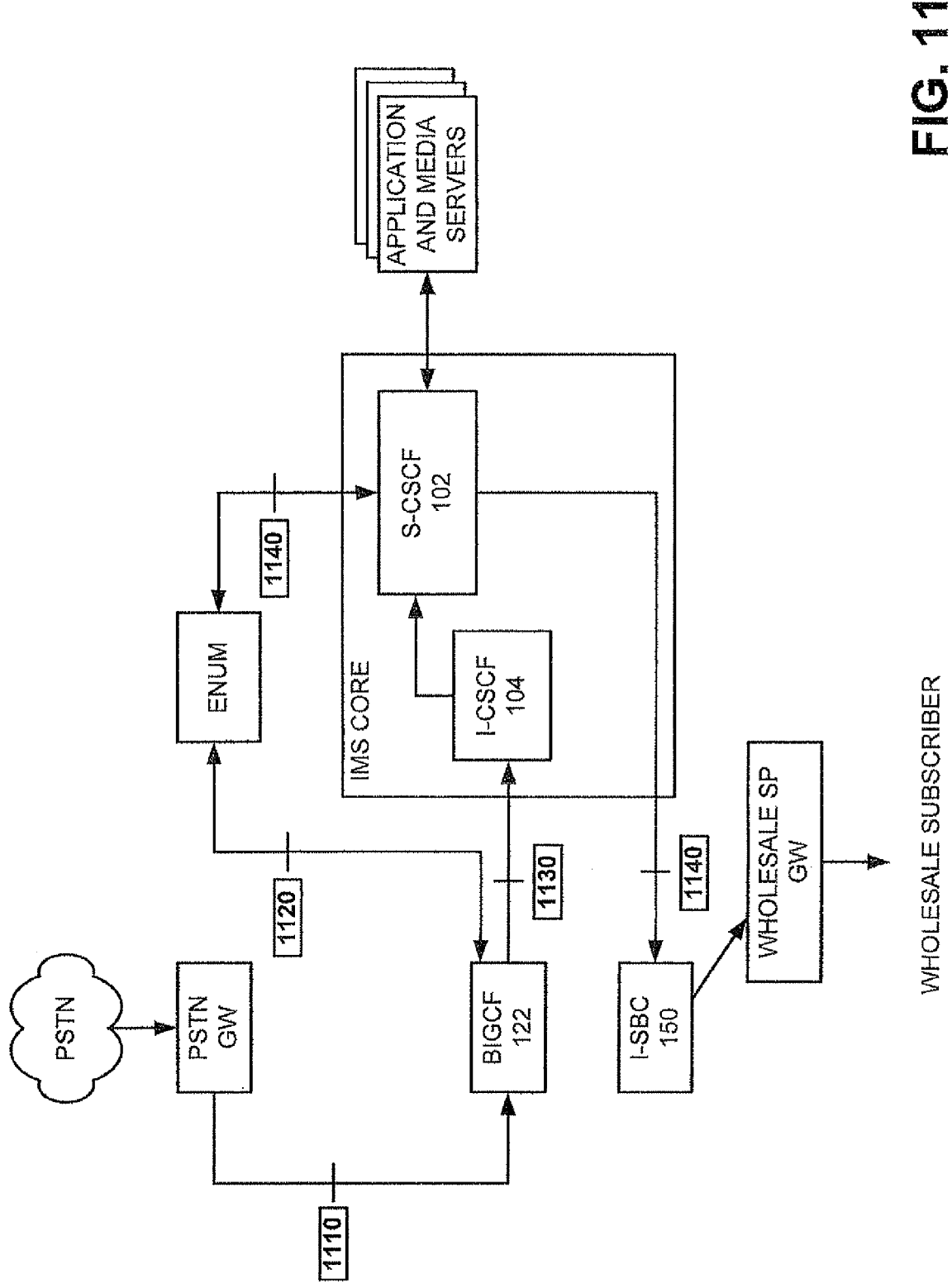

FIG. 11 illustrates exemplary processing for routing a call from a PSTN origination to a wholesale subscriber. In this example, assume that either the calling party and/or the called party invokes an IMS-based application.

As illustrated in FIG. 11, the call may be received from the calling party at a PSTN gateway (GW). The PSTN gateway may forward the call to BIGCF 122.

Processing may begin with BIGCF 122 receiving the call from the PSTN gateway (act 1110). In response to receiving the call, BIGCF 122 may query ENUM server 146 (e.g., using a NAPTR DNS query) based on the calling party number to determine whether the calling party is served by the IMS core (act 1120). If the calling party is served by the IMS core, the response from ENUM server 146 may include information identifying an I-CSCF 104 for the IMS core. If, on the other hand, the calling party is not served by the IMS core, the response from ENUM server 146 may include a NXDOMAIN or similar response code. BIGCF 122 may also query ENUM server 146 (e.g., using a NAPTR DNS query) based on the called party number to determine whether the called party is served by the IMS core (act 1120). If the called party is served by the IMS core, the response from ENUM server 146 may include information identifying an I-CSCF 104 for the IMS core. If, on the other hand, the called party is not served by the IMS core, the response from ENUM server 146 may include a NXDOMAIN or similar response code.

In this example, BIGCF 122 may determine that the call is to be directed to the IMS core. Thus, the response from ENUM server 146 may include information for routing the call to I-CSCF 104 of the IMS core. BIGCF 122 may route the call to I-CSCF 104 (act 1130). I-CSCF 104 may route the call to S-CSCF 102, which may perform the necessary application invocation. Since the call is directed to a wholesale subscriber, S-CSCF 102 may query ENUM server 146 to map the called party number to a SIP URI (act 1140). S-CSCF 102 may route the call with the SIP URI to a wholesale gateway, via an I-SBC 150 associated with that gateway (act 1150). In another implementation, S-CSCF 102 may use a static registration, in the case where an IMS application is invoked for the called party, to route the call to the wholesale subscriber.

The wholesale service provider gateway may then route the call to the appropriate wholesale subscriber. Therefore, in this example, BIGCF 122 may route the call through the IMS core for invoking one or more IMS applications for the call.

Figure 12:
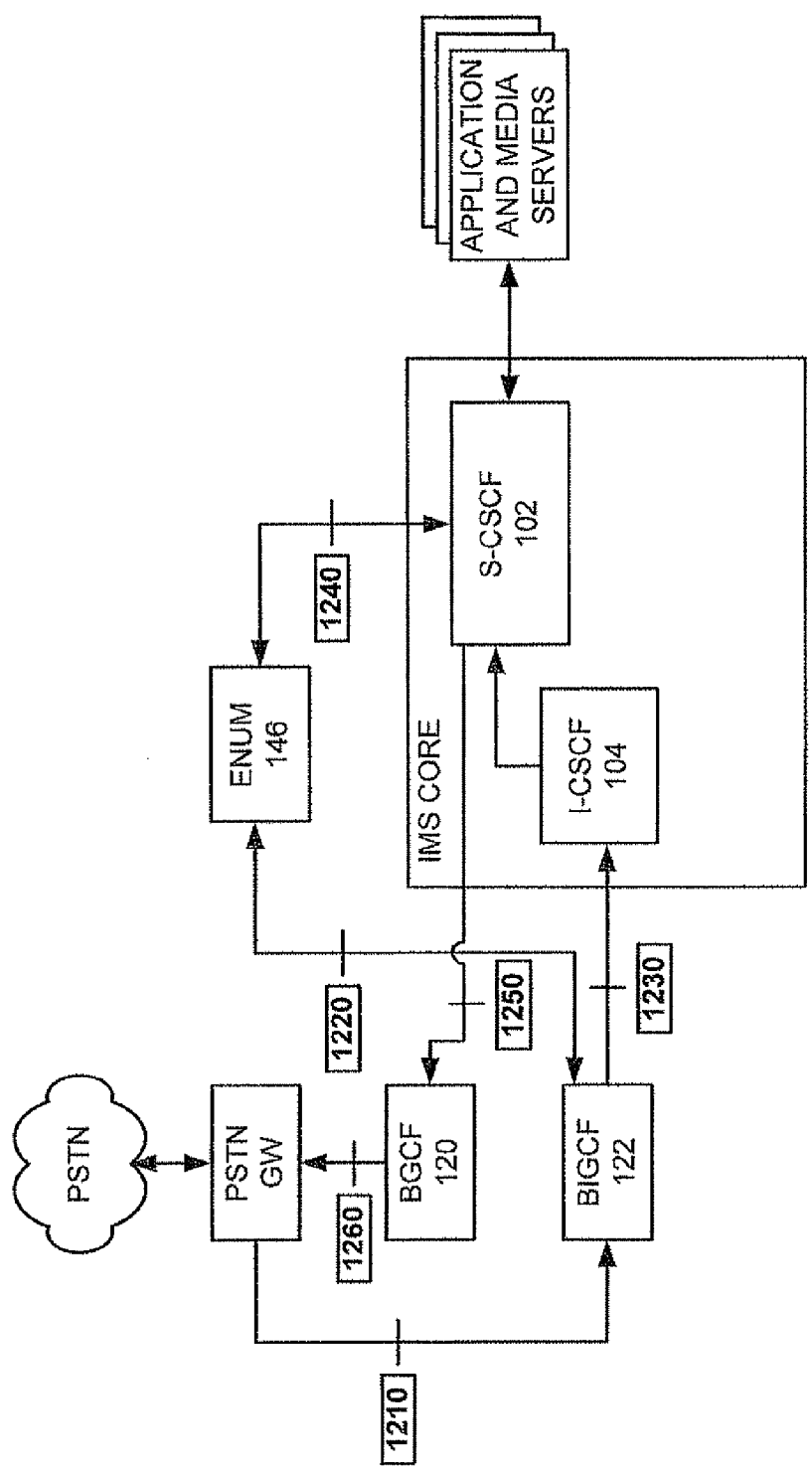

FIG. 12 illustrates exemplary processing for routing a call from a PSTN origination point to a PSTN termination point. In this example, assume that either the calling party (i.e., the PSTN origination point) and/or the called party (i.e., the PSTN termination point) invokes an IMS-based application.

As illustrated in FIG. 12, the call may be received from the calling party at a PSTN gateway (GW). The PSTN gateway may forward the call to BIGCF 122.

Processing may begin with BIGCF 122 receiving the call from the PSTN gateway (NGW or SLO) (act 1210). In response to receiving the call, BIGCF 122 may query ENUM server 146 (e.g., using a NAPTR DNS query) based on the calling party number to determine whether the calling party is served by the IMS core (act 1220). If the calling party is served by the IMS core, the response from ENUM server 146 may include information identifying an I-CSCF 104 for the IMS core. If, on the other hand, the calling party is not served by the IMS core, the response from ENUM server 146 may include a NXDOMAIN or similar response code. BIGCF 122 may also query ENUM server 146 (e.g., using a NAPTR DNS query) based on the called party number to determine whether the called party is served by the IMS core (act 1220). If the called party is served by the IMS core, the response from ENUM server 146 may include information identifying an I-CSCF 104 for the IMS core. If, on the other hand, the called party is not served by the IMS core, the response from ENUM server 146 may include a NXDOMAIN or similar response code.

In this example, BIGCF 122 may determine that the call is to be directed to the IMS core. Thus, the response from ENUM server 146 may include information for routing the call to I-CSCF 104 of the IMS core. BIGCF 122 may route the call to I-CSCF 104 (act 1230). I-CSCF 104 may route the call to S-CSCF 102, which may perform the necessary application invocation. Since the call is directed to a PSTN termination point, S-CSCF 102 may query ENUM server 146 to map the called party number to a SIP URI (act 1240). S-CSCF 102 may route the call with the SIP URI to BGCF 120 (act 1250).

BGCF 120 may identify a PSTN egress gateway (which may or may not be the same PSTN gateway that received the call and forwarded the call to BIGCF 122) for the call and route the call to the identified PSTN egress gateway (act 1260). The PSTN egress gateway may then route the call to the appropriate PSTN termination point. Therefore, in this example, BIGCF 122 may route the call through the IMS core for invoking one or more IMS applications for the call.

CONCLUSION

Implementations described herein provide a break in gateway control function that routes calls through an IMS core when needed. If a call involves an IMS subscriber or invokes an IMS application, the break in gateway control function may route the call through the IMS core. If on the other hand, a call does not involve an IMS subscriber or invoke an IMS application, the break in gateway control function may bypass the IMS core.

The foregoing description of exemplary implementations provides illustration and description, but is not intended to be exhaustive or to limit the invention to the precise form disclosed. Modifications and variations are possible in light of the above teachings or may be acquired from practice of the invention. For example, the call routing situations described above are provided for explanatory purposes only. Other call routing situations are possible that rely on the break in gateway control function. For example, calling routing from a wholesale subscriber/VoIP peering subscriber to a wholesale subscriber/VoIP peering subscriber may involve the break in gateway control function.

While series of acts have been described with respect to FIGS. 3-12, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Implementations consistent with principles of the invention are generally applicable to multimedia sessions implemented over an Internet Protocol infrastructure that uses E.164 numbers to identify endpoints. Neither the usage of terms (e.g., "call") frequently associated with telephony, nor the historic association of E.164 numbers with such services, limits the scope or applicability of this invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   at least one device to:
   receive a call request from a calling party to a called party, determine whether the calling party or the called party is served by an Internet Protocol Multimedia Subsystem (IMS) core,
route the call request toward the called party, and bypassing the IMS core when the calling party and the called party are not served by the IMS core, and
route the call request to the IMS core when the calling party is not served by the IMS core and the called party is served by the IMS core.

2. The system of claim 1, where the at least one device is further to:
route the call request to the IMS core when the calling party is served by the IMS core.

3. The system of claim 1, where, when determining whether the calling party or the called party is served by the IMS core, the at least one device is to:
query a database using information relating to the calling party, and
query the database using information relating to the called party.

4. The system of claim 3, where the information relating to the calling party and the information relating to the called party include telephone numbers.

5. The system of claim 1 where, when determining whether the calling party or the called party is served by the IMS core, the at least one device is to:
send a first domain name service (DNS) query to a database using information relating to the calling party, and
send a second DNS query to the database using information relating to the called party.

6. The system of claim 5, where the database includes a telephone number mapping database.

7. The system of claim 1, where the at least one device is further to:
store a list of originating hosts,
determine whether the call request was received from an originating host in the list of originating hosts, and
reject the call request when the call was not received from an originating host in the list of originating hosts.

8. The system of claim 1, where the at least one device is further to:
store a list of emergency numbers,
determine whether the call request is an emergency call request using the list of emergency numbers, and
route the call request to a breakout gateway control function when the call request is an emergency call request, the routing the call request to the breakout gateway control function bypasses the IMS core.

9. The system of claim 1, where the at least one device comprises:
a computer readable memory device containing instructions for causing the at least one device to perform at least one of the determining or the routing the call request to the IMS core.

10. A method performed by a network device, the method comprising:
receiving, by a communication interface of the network device, a call from a first party for a second party;
determining, by a processor of the network device and based on receiving the call, whether the first party is served by an Internet Protocol Multimedia Subsystem (IMS) core;
determining, by the processor of the network device and based on receiving the call, whether the second party is served by the IMS core;
routing, by the communication interface, the call toward the second party and bypassing the IMS core when the first party and the second party are not served by the IMS core; and
routing, by the communication interface, the call request to the IMS core when the first party is not served by the IMS core and the second party is served by the IMS core.

11. The method of claim 10,
where determining whether the first party is served by the IMS core includes:
querying a database using information relating to the first party, and
where determining whether the second party is served by the IMS core includes:
querying the database using information relating to the second party.

12. The method of claim 10,
where determining whether the first party is served by the IMS core includes:
sending a first domain name service (DNS) query to a database using information relating to the first party, and
where determining whether the second party is served by the IMS core includes:
sending a second DNS query to the database using information relating to the second party.

13. The method of claim 10, where determining whether the first party is served by the IMS core includes:
determining whether the first party invokes an IMS application.

14. The method of claim 10, where determining whether the first party is served by the IMS core includes:
determining at least one of whether the second party invokes an IMS application or whether the second party is an IMS subscriber.

15. A system comprising:
at least one device to:
receive a call request from a calling party to a called party,
neither the calling party nor the called party being an Internet Protocol Multimedia Subsystem (IMS) user,
evaluate whether the calling party has invoked an IMS application,
evaluate whether the called party has invoked an IMS application,
route the call request to the IMS core when at least one of the calling party or the called party has invoked the IMS application,
bypass the IMS core when the calling party and the called party have not invoked the IMS application,
receive another call request,
determine that the other call request is an emergency call request, and
bypass an IMS core based on the other call request being the emergency call request.

16. The system of claim 15, where the at least one device is further to:
store a list of originating hosts,
determine whether the call request was received from an originating host in the list of originating hosts, and
reject the call request when the call was not received from an originating host in the list of originating hosts.

* * * * *